United States Patent
Yousefpor et al.

(10) Patent No.: US 9,864,445 B2
(45) Date of Patent: Jan. 9, 2018

(54) TOUCH SCREEN BORDER REGIONS

(71) Applicant: Apple Inc., Cupertino, CA (US)

(72) Inventors: Marduke Yousefpor, San Jose, CA (US); Steven P. Hotelling, Los Gatos, CA (US); Kevin J. White, Los Gatos, CA (US); Shih Chang Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/627,995

(22) Filed: Feb. 20, 2015

(65) Prior Publication Data

US 2015/0160769 A1 Jun. 11, 2015

Related U.S. Application Data

(62) Division of application No. 12/636,605, filed on Dec. 11, 2009, now Pat. No. 8,982,058.

(Continued)

(51) Int. Cl.
*G06F 3/044* (2006.01)
*G06F 3/041* (2006.01)
(Continued)

(52) U.S. Cl.
CPC ........ *G06F 3/0412* (2013.01); *G02F 1/13338* (2013.01); *G06F 1/16* (2013.01);
(Continued)

(58) Field of Classification Search
CPC ...... G06F 3/0412; G06F 3/0416; G06F 3/044; G06F 3/041; G06F 3/038; G06F 3/047;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

JP 2000-163031 A 6/2000
JP 2002-342033 A 11/2002

OTHER PUBLICATIONS

Final Office Action dated Sep. 25, 2013, for U.S. Appl. No. 12/636,605, filed Dec. 11, 2009, 6 pages.
(Continued)

*Primary Examiner* — Dismery Mercedes
(74) *Attorney, Agent, or Firm* — Morrison & Foerster LLP

(57) ABSTRACT

Touch screens with more compact border regions can include an active area that includes touch sensing circuitry including drive lines, and a border region around the active area. The border region can include an area of sealant deposited on conductive lines, and transistor circuitry, such as gate drivers, between the active area and the sealant. The conductive lines can extend from the sealant to the active area without electrically connecting to the transistor circuitry. The conductive lines can have equal impedances and can connect the drive lines to a touch controller off of the touch screen. A set of drive signal characteristics for the drive lines can be obtained by determining a transfer function associated with each drive line, obtaining an inverse of each transfer function, and applying a set of individual sense signal characteristics to the inverse transfer functions to obtain the corresponding set of drive signal characteristics.

25 Claims, 24 Drawing Sheets

Related U.S. Application Data

(60) Provisional application No. 61/247,524, filed on Sep. 30, 2009.

(51) Int. Cl.
    *G02F 1/1333*     (2006.01)
    *G06F 1/16*     (2006.01)
    *G02F 1/1362*     (2006.01)
    *G09G 3/36*     (2006.01)

(52) U.S. Cl.
    CPC ........ *G06F 3/041* (2013.01); *G02F 1/136286* (2013.01); *G06F 3/0416* (2013.01); *G06F 2203/04112* (2013.01); *G09G 3/3677* (2013.01)

(58) Field of Classification Search
    CPC ............. G06F 2203/04103; G06F 1/16; G02F 1/13338; G02F 1/136286; G09G 3/3677; G09G 3/3688; G09G 3/3685; G09G 2300/0426
    See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,473,147 B1* | 10/2002 | Nakahara | G02F 1/1339 349/149 |
| 6,531,996 B1* | 3/2003 | Murade | G09G 3/3648 345/100 |
| 6,690,387 B2 | 2/2004 | Zimmerman et al. | |
| 6,882,396 B2* | 4/2005 | Ko | G02F 1/1345 349/149 |
| 7,015,894 B2 | 3/2006 | Morohoshi | |
| 7,184,064 B2 | 2/2007 | Zimmerman et al. | |
| 7,292,289 B2* | 11/2007 | Nagahama | G02F 1/133308 349/151 |
| 7,663,607 B2 | 2/2010 | Hotelling et al. | |
| 7,705,834 B2 | 4/2010 | Swedin | |
| 7,808,255 B2* | 10/2010 | Hristov | G06F 3/044 324/660 |
| 7,808,690 B2* | 10/2010 | Kubota | H01L 27/3276 359/245 |
| 7,916,247 B2 | 3/2011 | Nagasawa | |
| 8,319,725 B2* | 11/2012 | Okamoto | G02F 1/133305 345/107 |
| 8,479,122 B2 | 7/2013 | Hotelling et al. | |
| 8,593,385 B2* | 11/2013 | Lee | G09G 3/2003 345/100 |
| 8,982,058 B2 | 3/2015 | Yousefpor et al. | |
| 9,030,460 B2* | 5/2015 | Kim | G09G 3/3648 345/212 |
| 9,069,418 B2* | 6/2015 | Grunthaner | G06F 3/044 |
| 9,158,419 B2* | 10/2015 | Kim | G06F 3/044 |
| 9,491,852 B2* | 11/2016 | Lyon | G06F 3/0412 |
| 2002/0024511 A1* | 2/2002 | Ozawa | G09G 3/2011 345/204 |
| 2003/0080953 A1* | 5/2003 | Ting | G02F 1/13452 345/206 |
| 2005/0030464 A1* | 2/2005 | Wang | G02F 1/1345 349/149 |
| 2005/0088391 A1* | 4/2005 | Kim | G09G 3/3677 345/94 |
| 2006/0152500 A1 | 7/2006 | Weng | |
| 2006/0197753 A1 | 9/2006 | Hotelling | |
| 2006/0250083 A1* | 11/2006 | Oh | G09G 3/3208 313/512 |
| 2006/0267913 A1* | 11/2006 | Mochizuki | G09G 3/3688 345/100 |
| 2007/0273560 A1* | 11/2007 | Hua | G06F 3/0202 341/33 |
| 2007/0279543 A1* | 12/2007 | Park | G02F 1/136204 349/40 |
| 2008/0024407 A1* | 1/2008 | Yamaguchi | G02F 1/13452 345/87 |
| 2008/0191980 A1* | 8/2008 | Jeon | G09G 3/3677 345/87 |
| 2009/0189833 A1* | 7/2009 | Cho | G09G 3/3611 345/60 |
| 2009/0213054 A1 | 8/2009 | Masui | |
| 2009/0279029 A1 | 11/2009 | Kunii et al. | |
| 2009/0302193 A1* | 12/2009 | Chuang | G02B 3/0025 249/175 |
| 2009/0303193 A1* | 12/2009 | Lim | G06F 3/0416 345/173 |
| 2009/0314621 A1* | 12/2009 | Hotelling | G06F 3/0416 200/600 |
| 2010/0134427 A1* | 6/2010 | Tsai | G06F 3/0412 345/173 |
| 2010/0182530 A1* | 7/2010 | Fujikawa | G02F 1/1339 349/58 |
| 2010/0302178 A1* | 12/2010 | Liu | G06F 3/041 345/173 |
| 2011/0057892 A1 | 3/2011 | Kwak et al. | |
| 2011/0074705 A1 | 3/2011 | Yousefpor et al. | |
| 2011/0316803 A1* | 12/2011 | Kim | G06F 3/044 345/173 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action dated Mar. 1, 2013, for U.S. Appl. No. 12/636,605, filed Dec. 11, 2009, five pages.

Non-Final Office Action dated Mar. 13, 2014, for U.S. Appl. No. 12/636,605, filed Dec. 11, 2009, five pages.

Notice of Allowance dated Nov. 5, 2014, for U.S. Appl. No. 12/636,605, filed Dec. 11, 2009, eight pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

U.S. Appl. No. 12/283,435, filed Sep. 10, 2008, by C. Krah.

U.S. Appl. No. 12/545,669, filed Aug. 21, 2009, by M. Yousefpor et al.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

TOUCH SCREEN BORDER REGIONS

CROSS REFERENCE TO RELATED APPLICATIONS

This application is a divisional of U.S. patent application Ser. No. 12/636,605, filed Dec. 11, 2009, which claims benefit of U.S. Provisional Application No. 61/247,524, filed Sep. 30, 2009, the contents of which are incorporated by reference herein in their entirety for all purposes.

FIELD

This relates to border regions of touch screens and other touch sensing devices.

BACKGROUND

Many types of input devices are available for performing operations in a computing system, such as buttons or keys, mice, trackballs, touch sensor panels, joysticks, touch pads, touch screens, and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned behind the panel so that the touch sensitive surface can substantially cover the viewable area of the display device, and can include displays that have touch sensing circuitry integrated into the display, for example, integrated into the display pixel stackup, which is the stackup of material layers that form the display pixels. Touch screens generally can allow a user to perform various functions by touching or near touching the touch sensor panel using one or more fingers, a stylus or other object at a location dictated by a user interface (UI) including, for example, virtual buttons, keys, bars, displays, and other elements, being displayed by the display device. In general, touch screens can recognize a touch and the position of the touch on the touch screen, and the computing system can then interpret the touch in accordance with the display appearing at the time of the touch, and thereafter can perform one or more actions based on the touch.

In the case of some touch screens, a physical touch on the display is not needed to detect a touch. For example, in some capacitive-type touch screens, fringing fields used to detect touch can extend beyond the surface of the display, and objects approaching near the surface may be detected near the surface without actually touching the surface. Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate.

Because display and touch capabilities can impose different requirements on the touch screen, it can be challenging to mesh those requirements so that the touch screen can perform both display and touch capabilities effectively and efficiently. In particular, as the circuitry of touch sensing systems of touch screens becomes more integrated with (e.g., are disposed closer to or shared with) other circuitry of the touch screen, such as the circuitry of the display system, the other circuitry may interfere with touch sensing operation due to, for example, crosstalk, stray capacitances, etc.

SUMMARY OF THE DISCLOSURE

This relates to border regions of touch screens, and in particular, to compacting elements of the touch sensing and display systems in border regions more efficiently. Border regions of touch screens can include circuit elements of the touch sensing system, e.g., conductive lines that connect touch sensors in an active area of the touch screen to a touch processor elsewhere in the system. Border regions of touch screens can also include circuit elements of the display system, e.g., gate drivers that drive gate lines to address rows of display pixels in an LCD display. In some embodiments, a touch screen border region can include different regions, such as a region in which only certain types of circuit elements can be formed, i.e., a restricted structure region, and a region in which any type of circuit element can be formed, i.e., an unconstrained region. Various embodiments described below disclose arrangements of touch sensing system circuit elements and display system circuit elements that can utilize different regions of touch screen borders in different ways. Some of the potential advantages of various embodiments can include slimmer, more compact border regions and lighter weight.

As touch sensing and display circuitry becomes more closely integrated in border regions and elsewhere, the potential for one system interfering with the other can increase. Various embodiments described below include strategies that can help mitigate effects of one system on another. In some embodiments, for example, an effect on touch sensing caused by a gate line system in close proximity may be mitigated by one or more equalization methods. In this way, for example, interference between touch sensing and display systems can be mitigated, while allowing the systems to be more efficiently compacted in, for example, smaller border regions.

DETAILED DESCRIPTION

Figure 1:
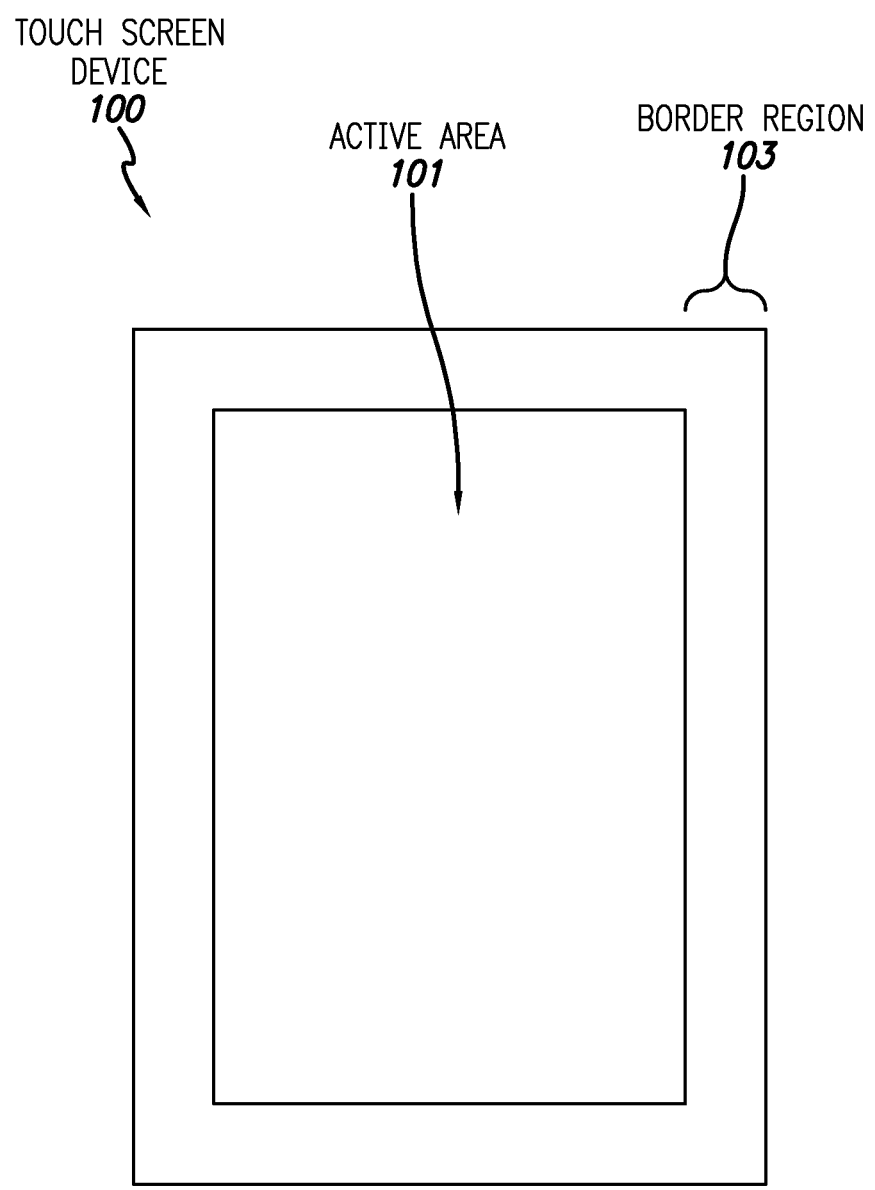
FIG. 1 illustrates a touch screen according to various embodiments.

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to border regions of touch screens, and in particular, to compacting elements of the touch sensing and display systems in border regions more efficiently. Various embodiments described below disclose arrangements of touch sensing system circuit elements, such as common voltage lines, and display system circuit elements, such as gate drivers and gate lines, that can utilize different regions of touch screen borders in different ways. Some of the potential advantages of various embodiments can include slimmer, more compact border regions and lighter weight. Various embodiments described below include strategies that can help mitigate effects of one system on another. For example, a nearby gate line system, e.g., gate drivers and voltage lines, may create an undesired capacitance with touch sensing circuitry that can create inaccuracies in touch measurements. In some example embodiments, such an effect on touch sensing caused by a gate line system may be mitigated by one or more equalization methods. In this way, for example, interference between touch sensing and display systems can be mitigated, while allowing the systems to be more efficiently compacted in, for example, smaller border regions.

The following description includes examples in which touch sensing circuitry can be integrated into the display pixel stackup (i.e., the stacked material layers forming the display pixels) of a display, such as an LCD display. While embodiments herein may be described in reference to LCD displays, it is understood that other displays may be utilized instead of the LCD display, such as generally any electrically imageable layer containing an electrically imageable material. The electrically imageable material can be light emitting, light modulating, etc. Light emitting materials can be inorganic or organic in nature. Suitable materials can include organic light emitting diodes (OLED), polymeric light emitting diodes (PLED), etc. The light modulating material can be reflective, transmissive, etc. Light modulating materials can include, without limitation, electrochemical materials, electrophoretic materials such as Gyricon particles, electrochromic materials, and liquid crystal materials. Liquid crystal materials can be, without limitation, twisted nematic (TN), super-twisted nematic (STN), ferroelectric, magnetic, and chiral nematic liquid crystals. Other suitable materials can include thermochromic materials, charged particles, and magnetic particles. Various embodiments are not restricted to red-green-blue (RGB) displays and can include other types of displays, such as monochrome displays. Touch sensing circuitry can include, for example, touch signal lines, such as drive lines and sense lines, grounding regions, and other circuitry.

Display pixel stackups can be manufactured by processes including depositing, masking, etching, doping, etc., of materials such as conductive materials (e.g., metal, substantially transparent conductors), semiconductive materials (e.g., polycrystalline silicon (Poly-Si)), and dielectric materials (e.g., $SiO_2$, organic materials, $SiN_x$). Various structures formed within a display pixel stackup can be designed to operate as circuitry of the display system to generate an image on the display. In other words, some of the stackup structures can be circuit elements of the display circuitry. Some embodiments of an integrated touch screen can include stackup structures that are circuit elements of the touch sensing circuitry, and may also include multi-function circuit elements that can form part of the display circuitry of the display system and part of the touch sensing circuitry of a touch sensing system that senses one or more touches on or near the display. In this way, for example, in some embodiments a display with integrated touch sensing capability may be manufactured using fewer parts and/or processing steps, and the display itself may be thinner, brighter, and require less power.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the structures to a particular direction or a particular coordinate system. Furthermore, although specific materials and types of materials may be included in the descriptions of example embodiments, one skilled in the art will understand that other materials that achieve the same function can be used. For example, it should be understood that elements described as metal, such as metal layers and metal lines, could be made of other electrically conductive materials, and that elements described as glass could be made of other dielectric materials. For example, a touch screen glass could be made of another different substantially transparent dielectric, such as plastic.

In some example embodiments, a touch screen, such as an LCD display with integrated touch sensing functionality, may include a matrix of voltage data lines and voltage gate lines to address circuit elements of the display pixels to display an image during a display phase, and to address the circuit elements of the display to sense touch during a touch sensing phase. For example, in some embodiments, some of the voltage lines may be driven with a first drive signal to drive the drive regions of the touch screen during the touch sensing phase. In addition, one or more of the voltage lines may be driven with a second drive signal that is 180 degrees out of sync with respect to the first drive signal used to drive the drive regions of the touch screen. These out of sync voltage lines may be used to reduce the static capacitance of the touch screens, as described in more detail below.

Some of the potential advantages of various embodiments of the disclosure, such as thinness, brightness, and power efficiency, may be particularly useful for portable devices, though use of embodiments of the disclosure is not limited to portable devices.

Although some embodiments may be described herein in terms of integrated touch screens, it should be understood that the various embodiments are not so limited, but can be generally applicable to devices utilizing display capabilities during a display phase and touch sensing capabilities during a touch sensing phase. It is also to be understood that various embodiments are not limited to displays having display and touch phases, but can be generally applicable to displays having other operating modes, such as scan mode, audio mode, text mode, etc. It is further to be understood that the switching circuitry can be incorporated into a display with an overlaying touch sensor panel, e.g., a touch screen, or into a display with touch sensing circuitry integrated therein, e.g., an integrated touch screen (which may also be referred to herein simply as a touch screen).

FIG. 1 shows a touch screen 100 that includes an active area 101 and a border region 103. Touch screen 100 could be, for example, a mobile touch screen device such as a digital music player, a mobile phone, etc. Active area 101 can correspond to the touch sensitive area and an area of the touch screen that displays an image such as a graphical user interface (GUI) that can include, for example, icons that a user can touch to activate particular functionality of touch screen 100. It can be desirable for border region 103 to be as narrow as possible, particularly for mobile device applications. However, there may be some constraints regarding the layout/configuration of structures, such as circuit elements, conductive lines, etc., in border region 103.

Figure 2:
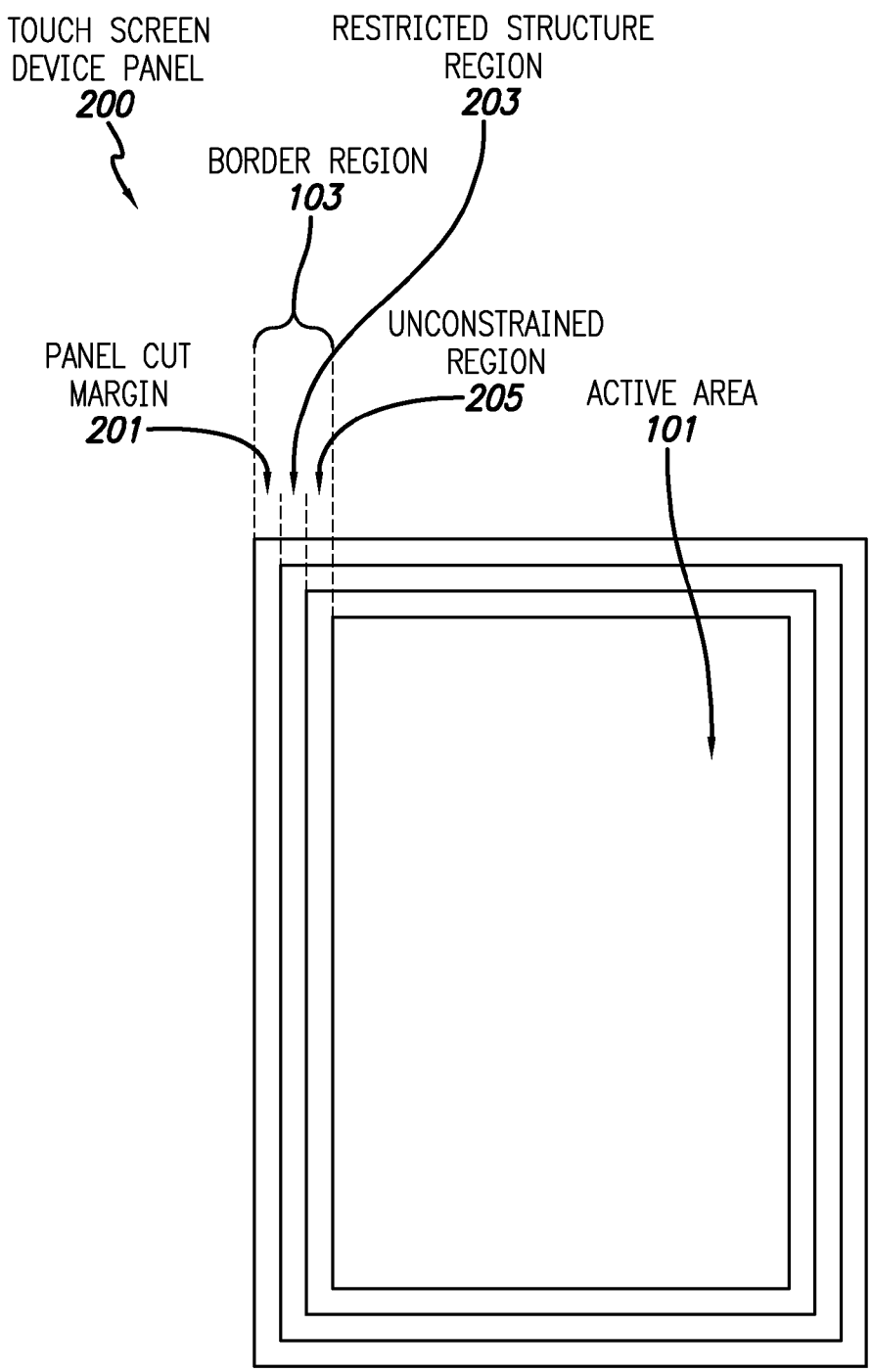
FIG. 2 illustrates the border region of a touch screen according to various embodiments.

FIG. 2 illustrates the border region 103 of touch screen 100 in greater detail. In particular, FIG. 2 shows an example touch screen device panel 200 as it may appear during a manufacturing process. FIG. 2 shows border region 103 includes a panel cut margin 201, a restricted-structure region 203, and an unconstrained region 205. In this example, touch screen device panel cut margin 201 can be a portion of the touch screen device panel 200 that may or may not be damaged during a scribing and cutting process occurring during the manufacture of the touch screen device panel. The uncertainty of whether panel cut margin 201 will be damaged can be due to the manufacturing processes. Therefore, during the manufacturing process of touch screen device panel 200, circuit elements, such as transistors, metal lines, etc. may not be formed in panel cut margin 201. Thus, panel cut margin 201 can be an example of a constraint on the layout of the circuit elements on touch screen device panel 200.

Other constraints during the manufacturing processes may dictate, for example, that certain circuit elements may not be formed in restricted-structure region 203. For example, some touch screen manufacturing processes can require a sealant to be deposited in an area close to the outer edge of the border region to seal components together. In order for the sealant to work properly, circuit elements formed in this area may need to be perforated to allow the sealant to leach through the element and seal properly. Thus, the area where the sealant may be formed can be an example of a restricted-structure region 203. While certain circuit elements such as transistors could not be formed of perforated material, some metal lines may be formed of perforated metal and still operate as required. The sealant can be deposited on top of the perforated material such as the metal lines. Therefore, in some embodiments, only structures made of perforated materials, such as metal lines, may be formed in restricted-structure region 203 during the manufacturing process. Unconstrained region 205 has no constraints on the types of circuit elements that can be formed in the region. Therefore, in this example embodiment, unconstrained region 205 can be the only region in border region 103 in which certain circuit elements, such as transistors, may be formed.

Figure 3:
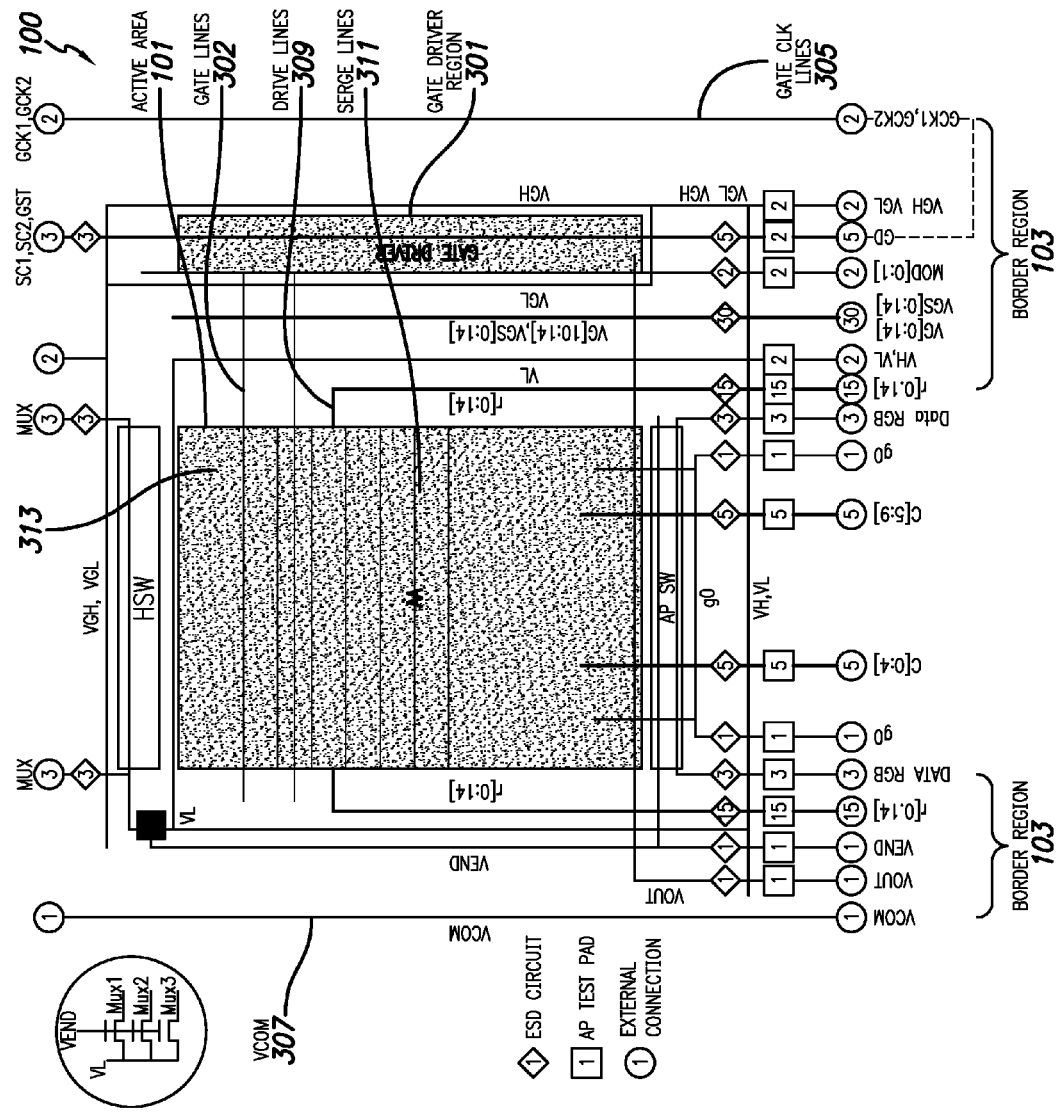
FIG. 3 illustrates a more detailed view of a touch screen according to various embodiments.
Figure 3:
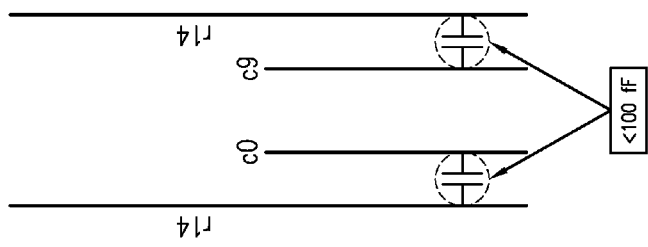

FIG. 3 shows a more detailed view of touch screen 100. In particular, FIG. 3 shows details of border region 103 including various lines and connections in the border region. FIG. 3 shows that border region 103 can include a gate driver region 301 that drives the gates of transistors in active area 101. Specifically, gate driver region 301 can transmit gate signals on gate lines 302. Border region 103 can also include gate clock lines 305 (GCK) 1 and 2. Gate voltage lines VGH (high) and VGL (low), ground voltage lines VG and VGS, voltage lines VH (high) and VL (low), drive lines r[0:14], data lines (data RGB), ground line g0, sense lines c[0:4] and c[5:9], a voltage out (Vout) line and a common voltage line (Vcom) can also be provided. Drive lines 309 and sense lines 311 in active area 101 can be used to sense touch. Specifically, stimulation signals transmitted through drive lines 309 can result in sense signals in sense lines 311, due to a mutual capacitance coupling between the drive and sense lines. The sense signals can provide information about a signal capacitance (Csig) 313 between the drive lines and sense lines. When an object such as a finger approaches the intersection of a drive and sense line, the signal capacitance Csig can change due to the presence of the object. A resulting sense signal received through the corresponding sense line 311 can be used to detect the presence of the object due to the change in Csig.

As shown in FIG. 3 the right border region 103 can include more structures than the left border region 103. In some devices such an uneven distribution may be undesirable. For example, border regions 103 of touch screen 100 as shown in FIG. 1 can be designed to be the same width, for example, for aesthetic reasons. Therefore, the uneven distribution of structure in the border regions may not be the most efficient use of the border area.

Figure 4:
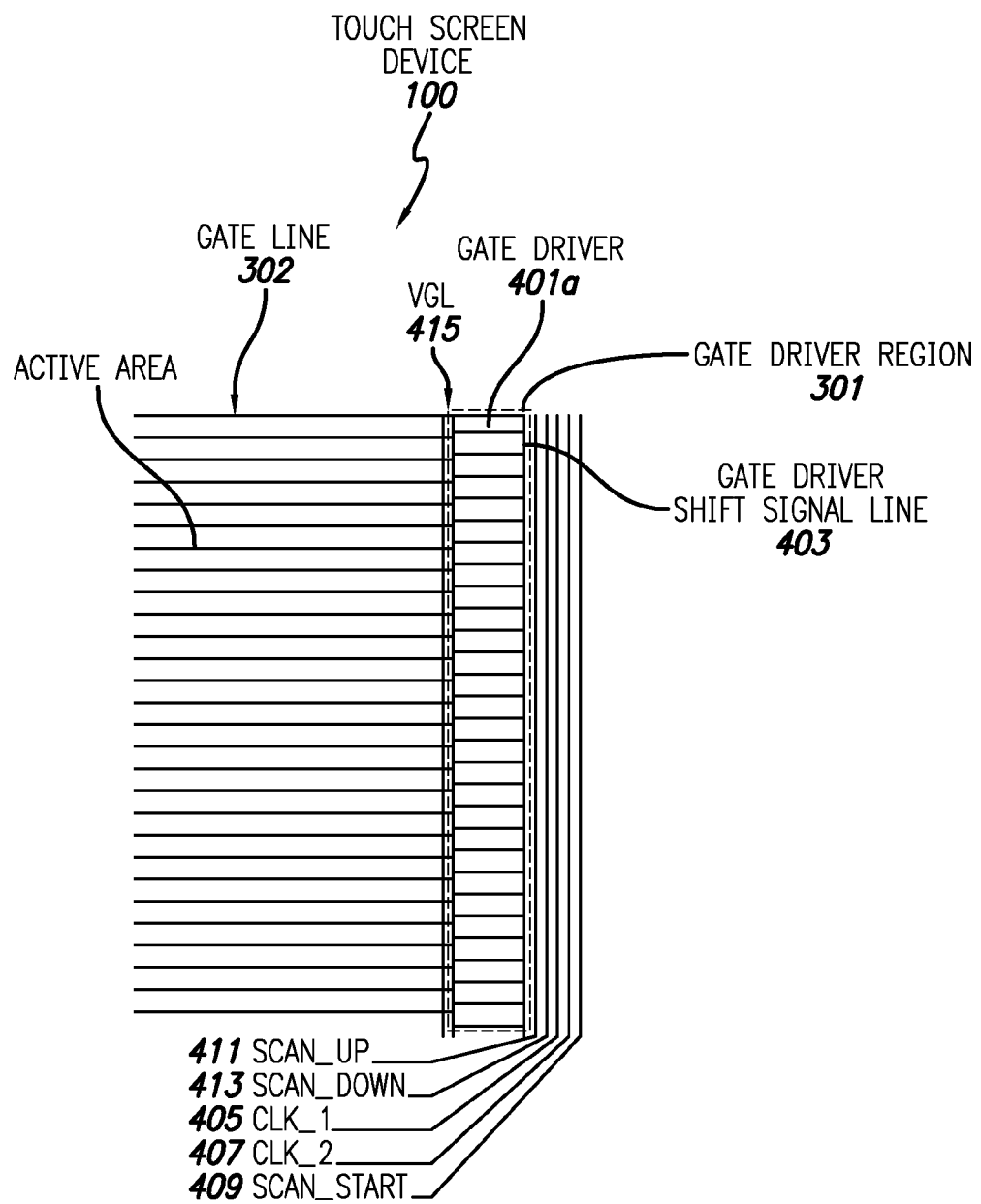
FIG. 4 illustrates a closer view of some of the structures in a border region of a touch screen according to various embodiments.

FIG. 4 is a closer view of some of the structures in border region 103 of touch screen 100. Gate driver region 301 can include gates drivers 401 and gate driver shift signal lines 403. FIG. 4 also illustrates a first clock line 405 (CLK_1), a second clock line 407 (CLK_2), a scan start line 409 (SCAN_START), a scan up line 411 (SCAN_UP), and a scan down line 413 (SCAN_DOWN). FIG. 4 also shows a low gate voltage line 415 (VGL) and gate lines 302. During operations, gate drivers 401 can operate to switch gates of transistors in active area 101 in a particular scan sequence. For example, when a scan start signal has been given through scan start line 409, a first gate driver 401a (shown as the top-most gate driver in FIG. 4) can apply a gate signal to the corresponding gate line 302a. Clock lines 405 and 407 can function in conjunction with gate driver shift signal line 403 to operate gate drivers 401 as a shift register such that when a gate driver is applying the gate signal to its corresponding gate line, the corresponding gate signal can be applied to the gate driver's shifts signal line 403. Therefore the next gate driver 401b (i.e., the next gate driver down from the first gate driver 401a, in a down scan) can receive the gate signal through the first gate driver's shift signal line 403, and during the next clock cycle the next gate driver 401b switch to an active state and apply a gate signal to its corresponding gate line 302b. The scan down phase can be controlled by a signal on scan down line 413. During a next phase, a scan up phase which can be controlled by scan up line 411, gate drivers 401, gate driver shift signal line 403, and clock lines 405 and 407, can operate in a similar manner, but the directions of the gate driver sequence can be reversed, i.e., from bottom to top. Each gate driver 401 can drive a single gate line across the entire width of the active area, and can be called a full strength gate driver.

Gate driver 401 can be formed primarily of areas of transistor circuitry and other circuitry. Different functions of gate driver 401 can be performed by circuitry in different areas of gate driver 401.

While the uneven configurations of circuit structures in the border regions 103 shown in FIGS. 3 and 4 can work in some applications, other applications may benefit from a different approach in which the border regions on opposite sides of the active region can be more equal in width.

Figure 5:
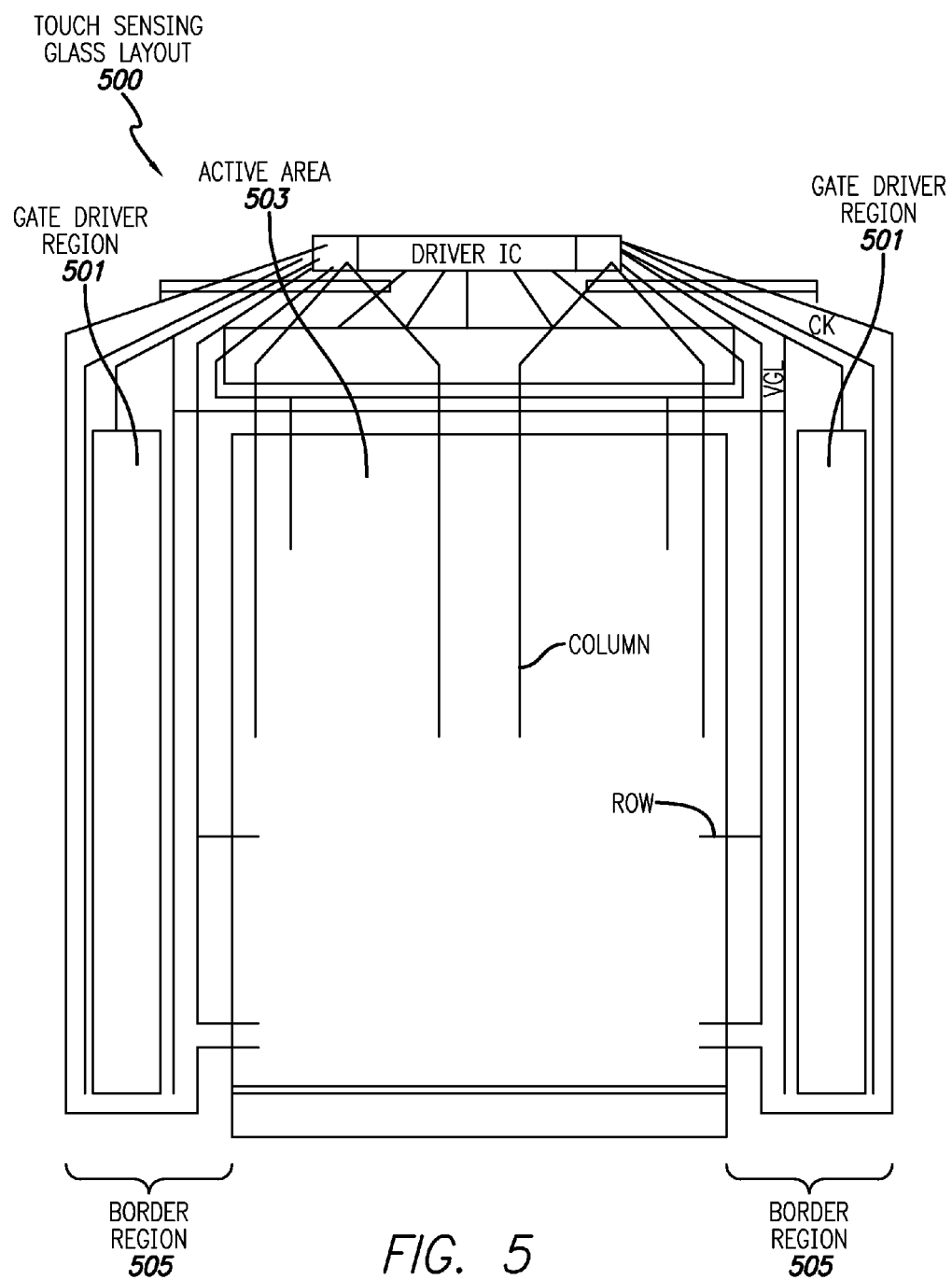
FIG. 5 illustrates an example touch screen glass layout according to various embodiments.

FIG. 5 shows an example touch screen layout glass 500 according to some embodiments. In the example configuration shown for a touch screen glass layout 500, gate driver regions 501 can be positioned on opposite sides of an active area 503. In this configuration, gate driver region 501 on the left side of active area 503 can drive the odd gate lines of the active area and gate driver region 501 on the right side of the active area can drive the even gate lines. Other configurations may be used, such as the left gate driver region driving the even gate lines and the right gate driver region driving the odd gate lines, or other configurations. The configuration of touch screen glass layout 500 may have some advantages with respect to the use of the border regions. For example, border regions 505 can include a more equal amount of structure, and therefore the minimum width of the right and left border regions 505 may be very similar or substantially equal. In other words, the border regions structures may be more evenly distributed between the right and the left.

Figure 6:
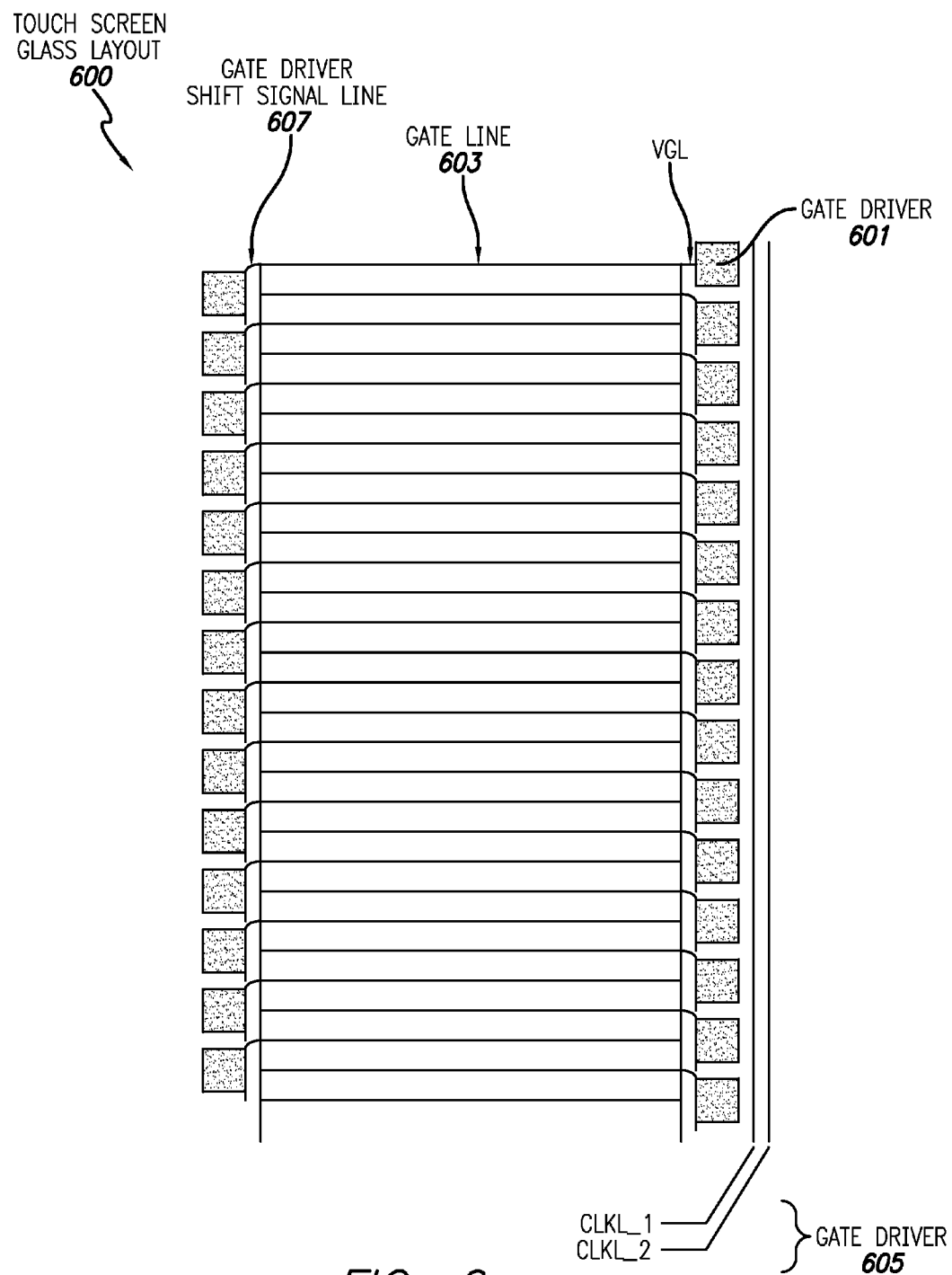
FIGS. 6, 7, and 8 illustrate various example gate driver configurations according to various embodiments.
Figure 7:
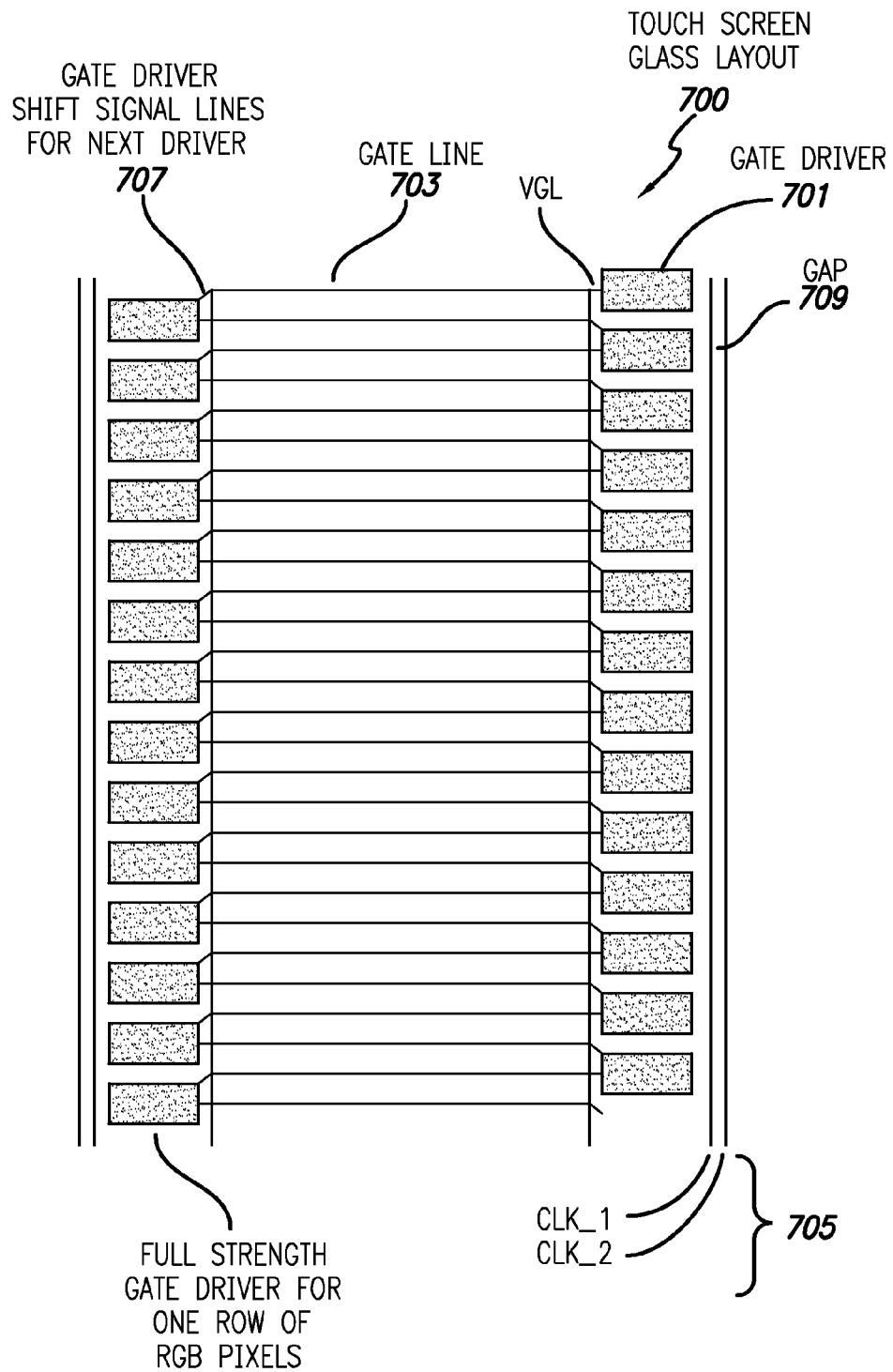
Figure 8:
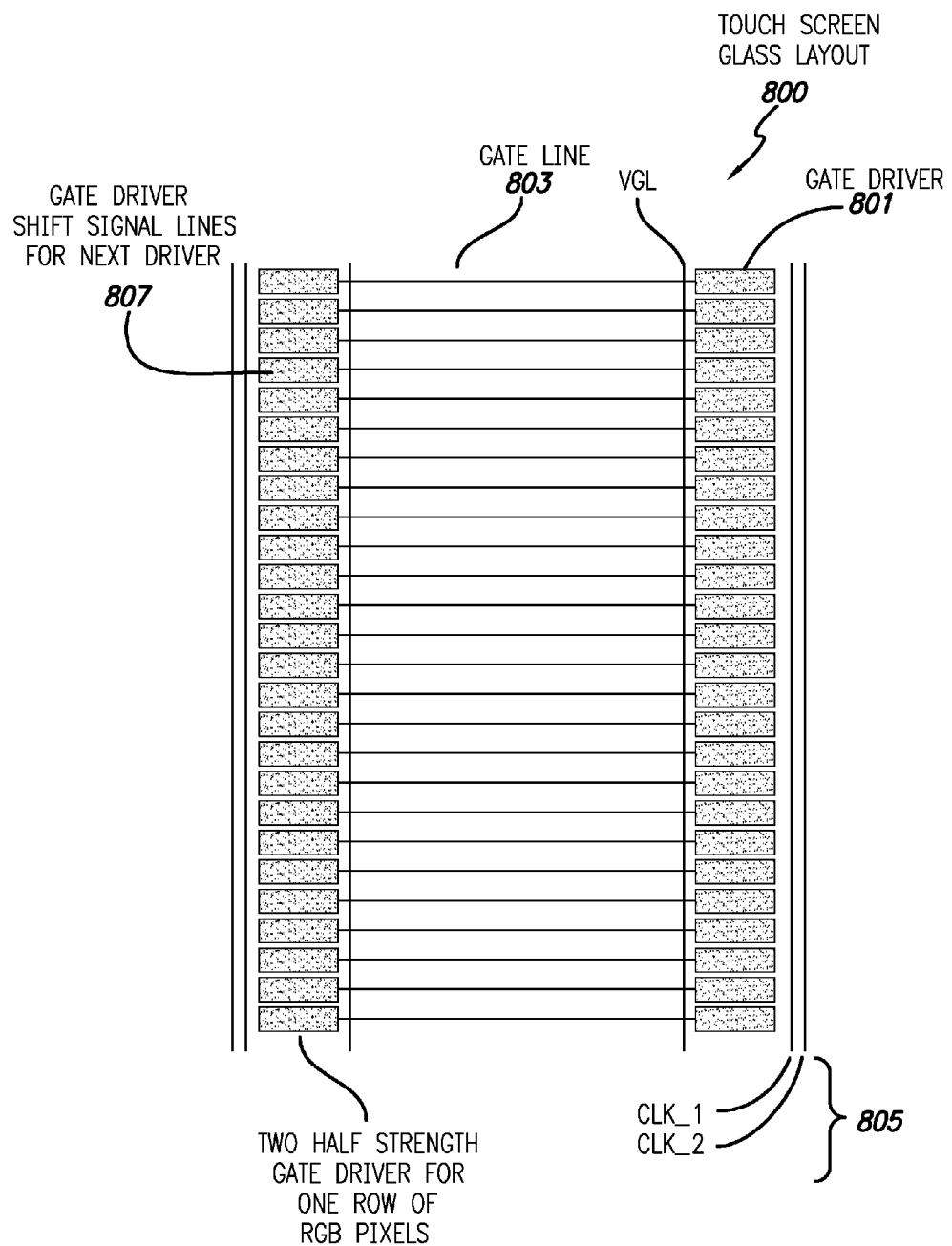

FIGS. 6, 7, and 8 show various example gate drivers configurations according to various embodiments. In example embodiments shown in FIGS. 6 through 8, the gate driver regions are on opposite sides of the active area of the touch screen panel. FIG. 6 shows gate drivers 601, gate lines 603, clock lines 605, and gate driver shift signal lines 607. As in the previous example embodiments shown in FIGS. 4 and 5, in which gate drivers 401 are disposed on one side of the active area of the touch screen, each gate driver 601 can drive a gate line 603 for one row of display pixels, such as red, green, and blue (RGB) pixels of a typical RGB display that can form a part of touch screen layout 600. However, because drivers 601 on one side of the active area can be driving only every other gate line, the vertical spacing between gate drivers can be approximately double that of a configuration in which all gate drivers are on one side. Therefore the shape of the area of touch screen glass layout 600 in which the structure of each gate driver can be formed can be different than in the previous example embodiment, for example. In other words, in the two example embodiments the totality of the gate drivers 401 can have the same area as the totality of the gate drivers 601, even though gate drivers 401 can be rectangular and gate drivers 601 can be square. The square shape of gate drivers 601 can allow more of the area of the gate drivers to be positioned closer to the active area of the touch screen glass layout. In other words, by moving every other gate driver to the other side of the touch screen glass, additional area can be available closer to the active area for the remaining gate drivers.

FIG. 7 shows another example gate driver configuration according to various embodiments. The gate driver configuration can include a touch screen glass layout 700, including gate drivers 701, gate lines 703, clock lines 705, and gate driver shift signal lines 707. In the example configuration shown in FIG. 7, each gate driver 701 can drive a single gate line, i.e., each gate driver can be a full strength gate driver for one row of RGB pixels, for example. Similar to the example configuration shown in FIG. 6, the gate drivers of the example configuration in FIG. 7 can be divided between right and left sides of the touch screen glass layout. However, in contrast to the configuration of FIG. 6, the gate drivers 701 can have essentially the same shape as the example configuration shown in FIGS. 4 and 5. However, there can be gaps 709 between adjacent gate drives in this configuration. Gaps 709 may be beneficial in some applications. For example, in some applications it may be beneficial to form structures in gaps 709 that would not normally be able to be formed in that area of the border. Without the gaps, for example, metal lines from the outer portion of the border region to the active area could overlap the gate drivers. This may cause interference with the operation of the gate drivers. Therefore, in some embodiments, metal lines from the outer portion of the border region to the active region can be formed over or in the gaps instead of covering the gate drivers.

FIG. 8 illustrates another example configuration according to various embodiments. FIG. 8 shows an example of touch screen glass layout 800 that can include gate drivers 801, gate lines 803, clock lines 805, and gate driver shift signal lines 807. In contrast to the previous embodiments, each gate line can be driven by two gate drivers 801. Therefore, each of the gate drivers 801 that drive a single gate line 803 may be approximately half the strength of gate drivers that drive gates in an entire row of RGB pixels, as in previous embodiments. Because gate drivers 801 need only the half the strength of, for example, gate drivers 401 shown in FIGS. 4 and 5, gate drivers 801 can be smaller, i.e., require less area to form the necessary structures to accomplish driving gates for half of the gate line. However, in this configuration gate drivers can be on both sides of an active area, and there can be no substantial gaps between the gate drivers in each gate driver region.

Figure 9:
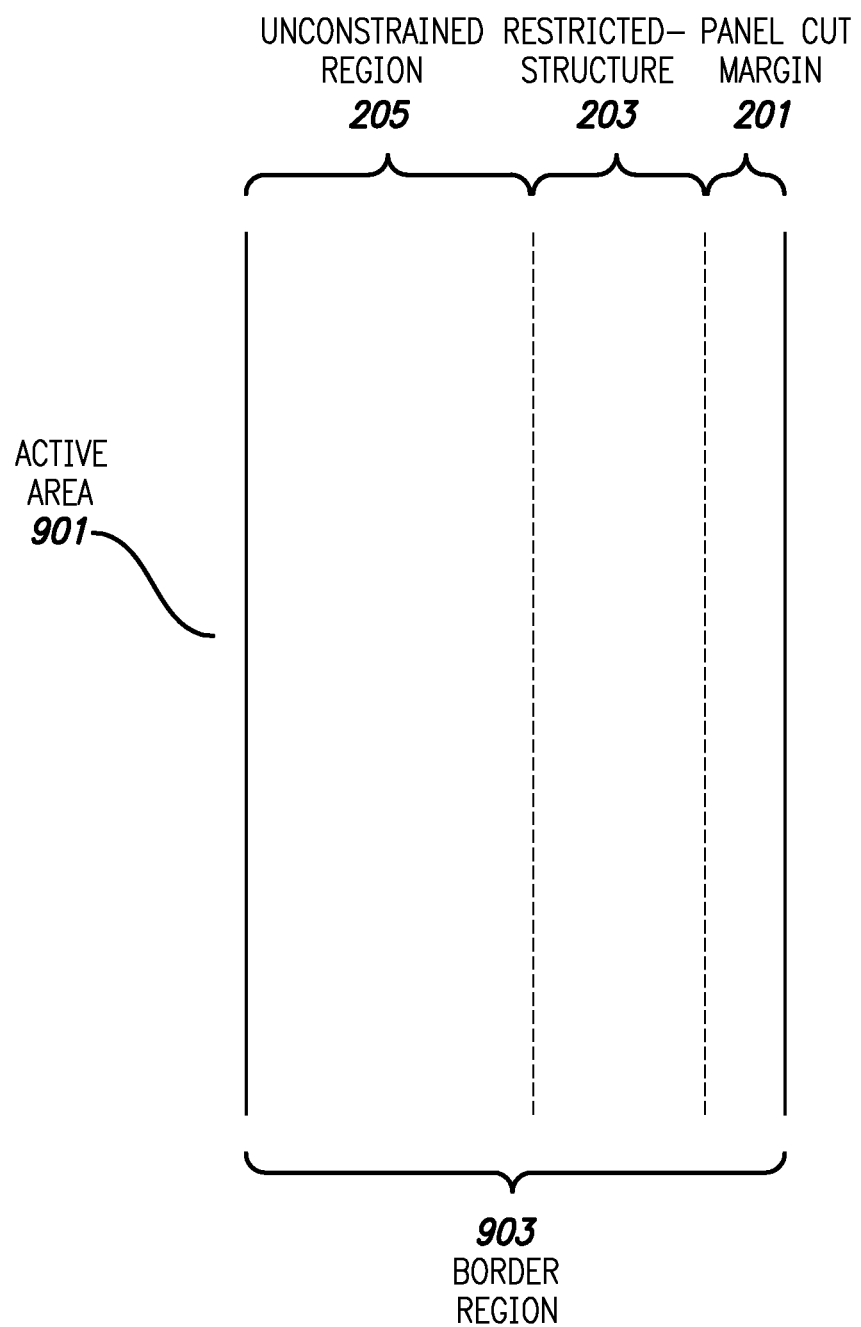
FIG. 9 illustrates an enlarged view of a border region of a touch screen glass layout panel during a manufacturing process according to various embodiments.

FIG. 9 illustrates an enlarged view of border region 103 shown in FIG. 2 as the border region of a touch screen glass layout panel during a manufacturing process. FIG. 9 shows a border region 103 on the right side of a touch screen, and therefore shows active area 101 to the left of the border region. The particular distribution of regions associated with one or more constraints in border region 103 can result in limited design choices for configurations of circuit structures that reside in the border region. The regions of constraints in the border region can, as a result, make it difficult to reduce the width of the border regions of some devices. For example, the gate drivers, such as the example gate drivers described above, can include large areas of transistors that could not be positioned in a restricted-structure region in which a sealant was to be deposited. Therefore, gate drivers may be formed only in unconstrained region 205 in the example border region 103, for example. On the other hand, metal lines, such as Vcom lines, can be formed in unconstrained region 205 and/or restricted-structure region 203. No structures may be formed in panel cut margins 201 because that area can be used as a buffer against damage to the circuit structures due to manufacturing processes.

Figure 10:
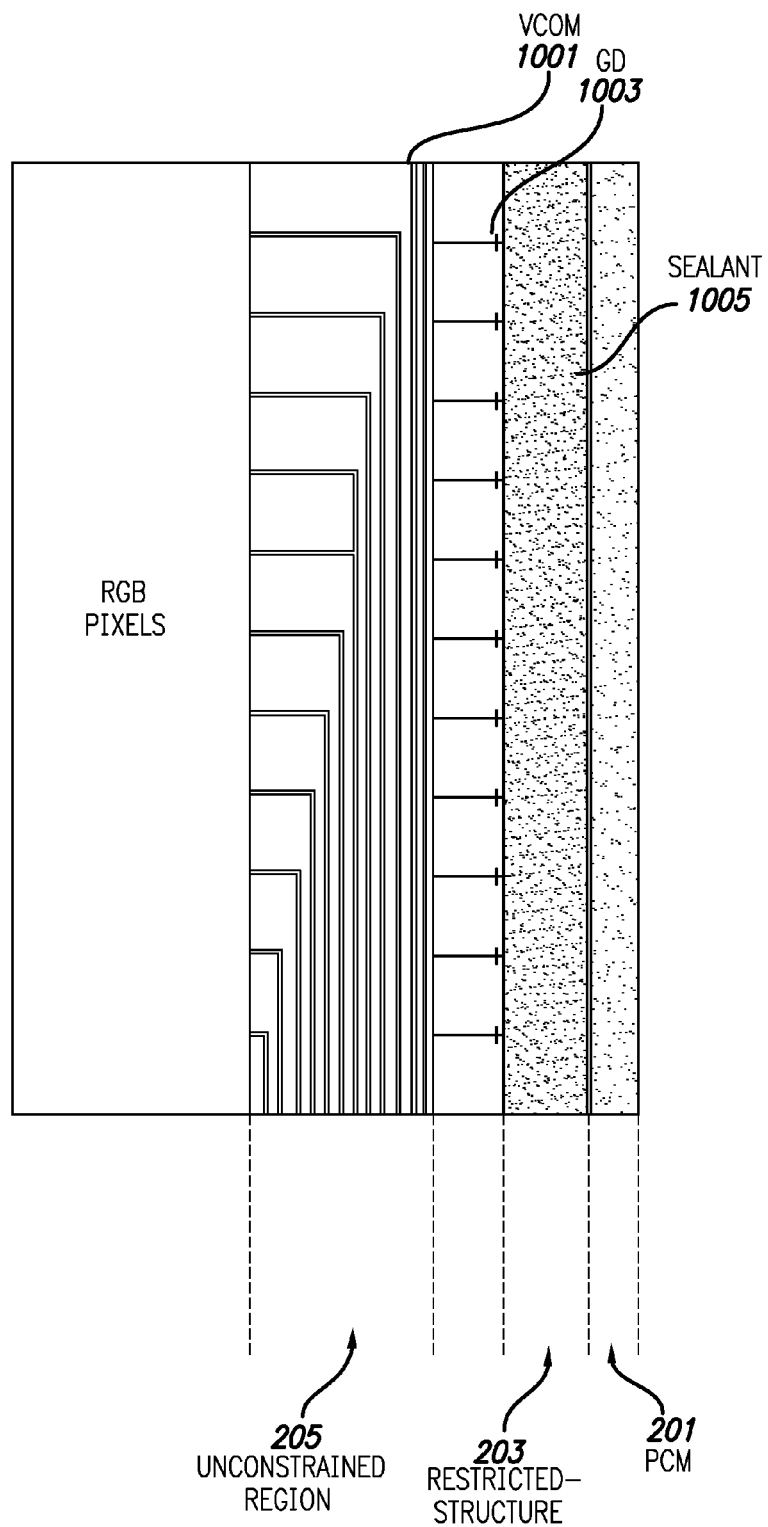
FIG. 10 illustrates an example configuration of circuit structures in a border region according to various embodiments.

FIG. 10 shows an example configuration of circuit structures in border region 103 according to various embodiments. FIG. 10 shows unconstrained region 205, restricted-structure region 203, and panel cut margin 201. Vcom lines 1001 and gate drivers 1003 can be formed in unconstrained region 201. Restricted-structure region 203 can include only sealant 1005, and no structures may be formed within panel cut margin 201. In this example embodiment, Vcom lines 1001 do not overlap gate drivers 1003, which may help reduce interference between the Vcom lines and the gate drivers. In this example embodiment, gate drivers 1003 can be in a similar configuration as gate drivers 601 shown in FIG. 6, i.e., the gate drivers on one side of the active area can drive every other gate line, and each gate driver can drive the gates for an entire gate line. The shape of each gate driver can be approximately a square, and the distance between each adjacent gate driver can be substantially small. In some embodiments, other gate driver configurations may be used.

Figure 11:
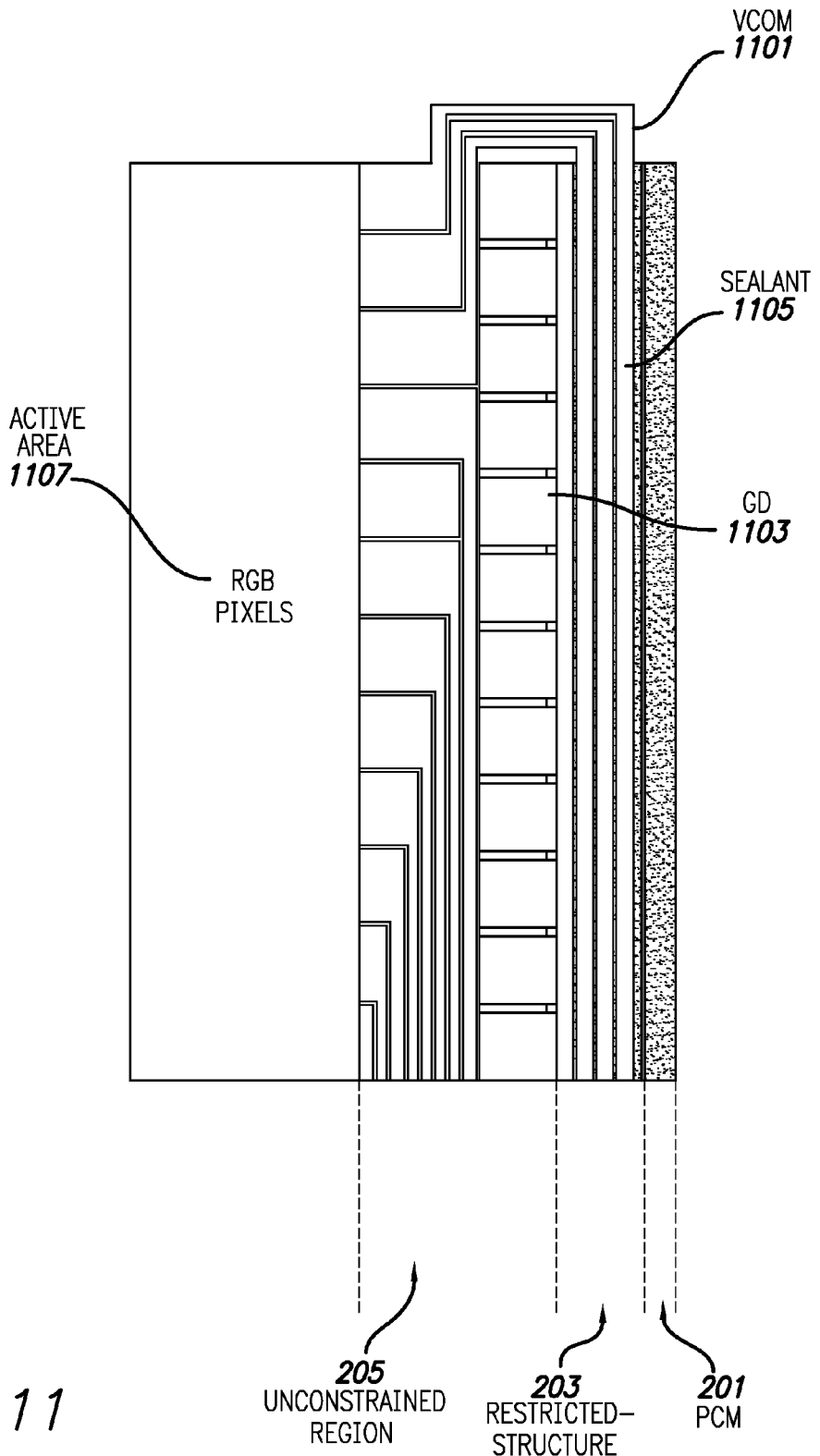
FIG. 11 illustrates another example configuration according to various embodiments.

FIG. 11 shows another example configuration according to various embodiments. In this example, Vcom lines 1101 can be formed in an unconstrained region 205 and between an active area 1107 and gate drivers 1103. Vcom lines 1101 can also be formed in a restricted-structure region 203 along with a sealant 1105. As a result, Vcom lines 1101 in the restricted-structure region may be perforated to allow the sealant to work properly. Once again, in this example configuration, the gate driver configuration can be similar to that shown in FIG. 6. The configuration of the present embodiment may allow for reduction in the width of border region 103 because two types of structures can now be included in restricted-structure region 203, therefore, more efficient use can be made of restricted-structure region 203. In order to reduce interference between Vcom lines 1101 and gate drivers 1103, some of the Vcom lines can be routed around the gate driver region to the outer side of border region 203.

Figure 12:
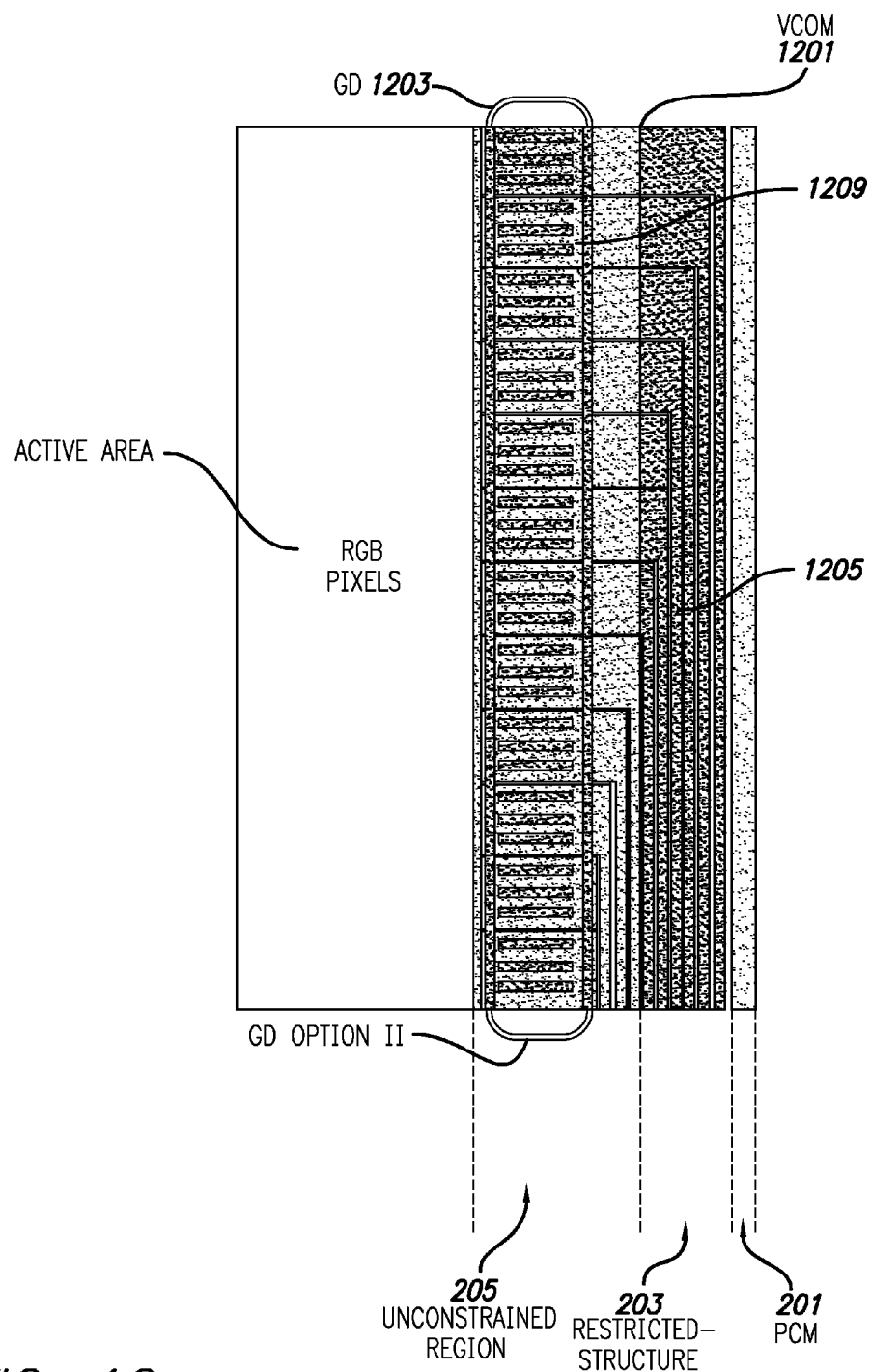
FIG. 12 illustrates another example configuration according to various embodiments.

FIG. 12 illustrates another example configuration according to various embodiments. In this configuration, gate drivers 1203 can be formed in the unconstrained region 201 and close to the active region, and Vcom lines 1201 can be formed substantially on the side of the gate drivers opposite to the active region. Vcom lines 1201 can be formed in unconstrained region 205, and also in restricted-structure region 203 along with a sealant 1205. As a result the Vcom lines 1201 in the restricted-structure region may be perforated to allow the sealant to work as intended. In this example, the gate driver configuration can be similar to that of FIG. 7, therefore, there can be gaps 1209 in between gate drivers 1203. Portions of Vcom lines 1201 can be formed over and/or in the gaps between gate drivers 1203, which may help reduce interference between the Vcom lines and the gate drivers because the Vcom lines are not passing directly over the gate drivers. Because more of the restricted-structure region can be used for the sealant and metal lines (i.e., Vcom lines 1201 in this case) this example configuration may have an advantage of small border width. The other gate driver configurations may also be used even if they may result in increased interference of Vcom lines and gate drivers.

Figure 13:
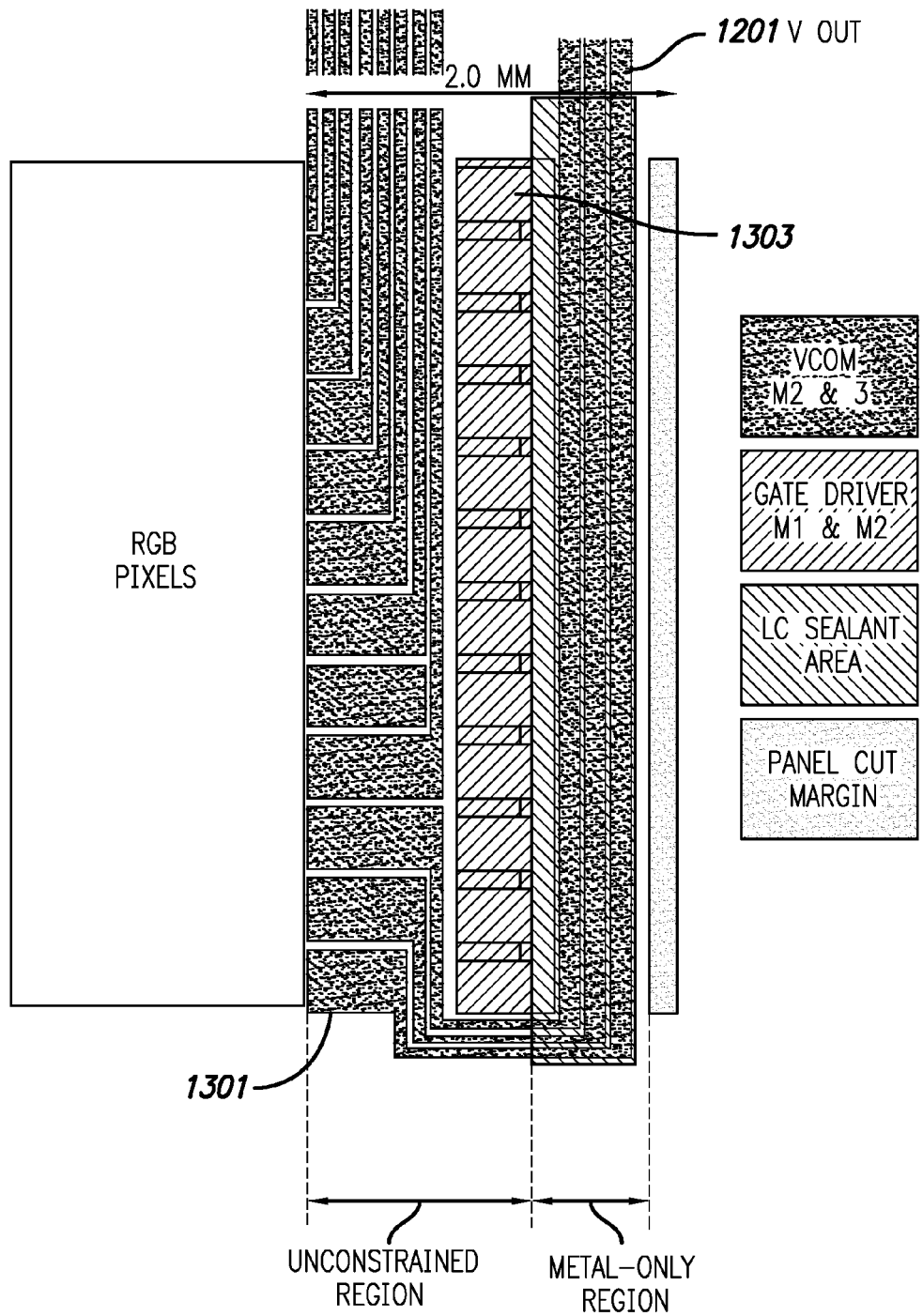
FIG. 13 illustrates another example configuration according to various embodiments using a combination of square gate drivers along the lines of that shown in FIG. 6 and a Vcom lines layout similar to that shown in FIG. 11.

FIG. 13 shows a combination of square gate drivers 1303 along the lines of that disclose and FIG. 6 and the Vcom lines 1301 layout similar to that shown in FIG. 11. FIG. 13 also illustrates Vcom out lines 1301a that extend off of one side of the panel, in this case in the upward direction as shown in FIG. 13. However, it may advantageous to have Vcom out lines to form connections off of more than one side of the panel.

Figure 14:
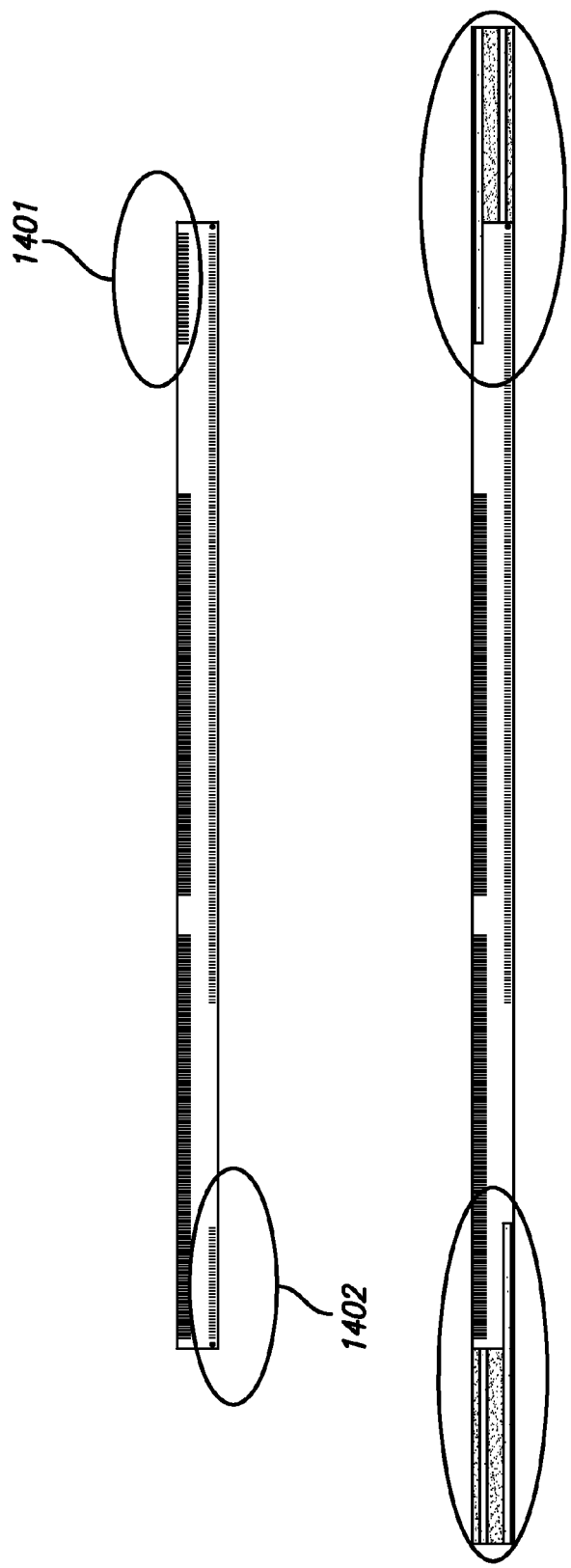
FIG. 14 is a side view of an example flexible circuit board with connections on two (opposite) sides of the flex circuit according to various embodiments.

FIG. 14 is a side view of an example flexible circuit board with connections on two (opposite) sides of the flex circuit. This multiple-output configuration might be advantageous for routing purposes of the Vcom lines.

Figure 15:
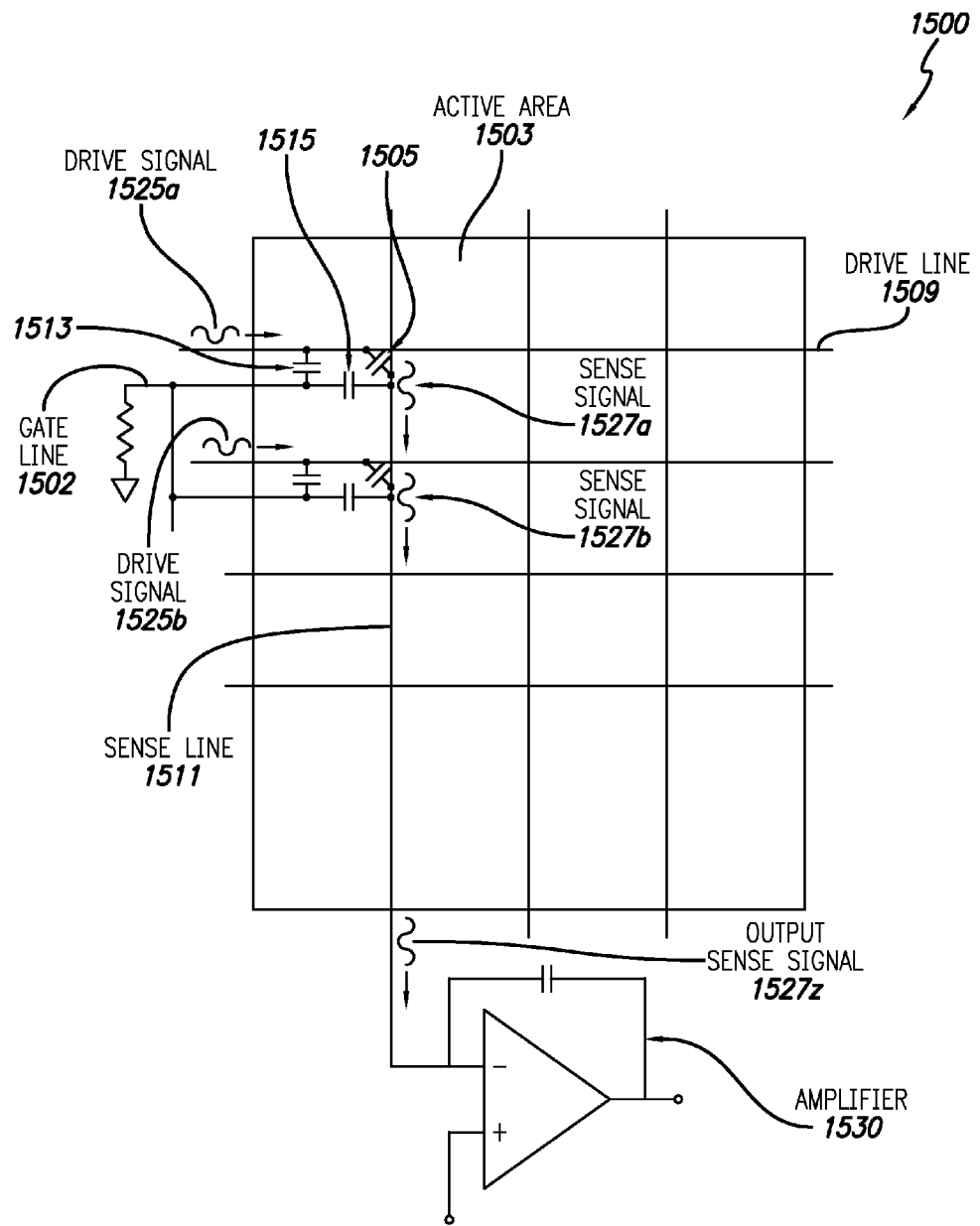
FIG. 15 illustrates a touch screen glass layout according to various embodiments.
Figure 16:
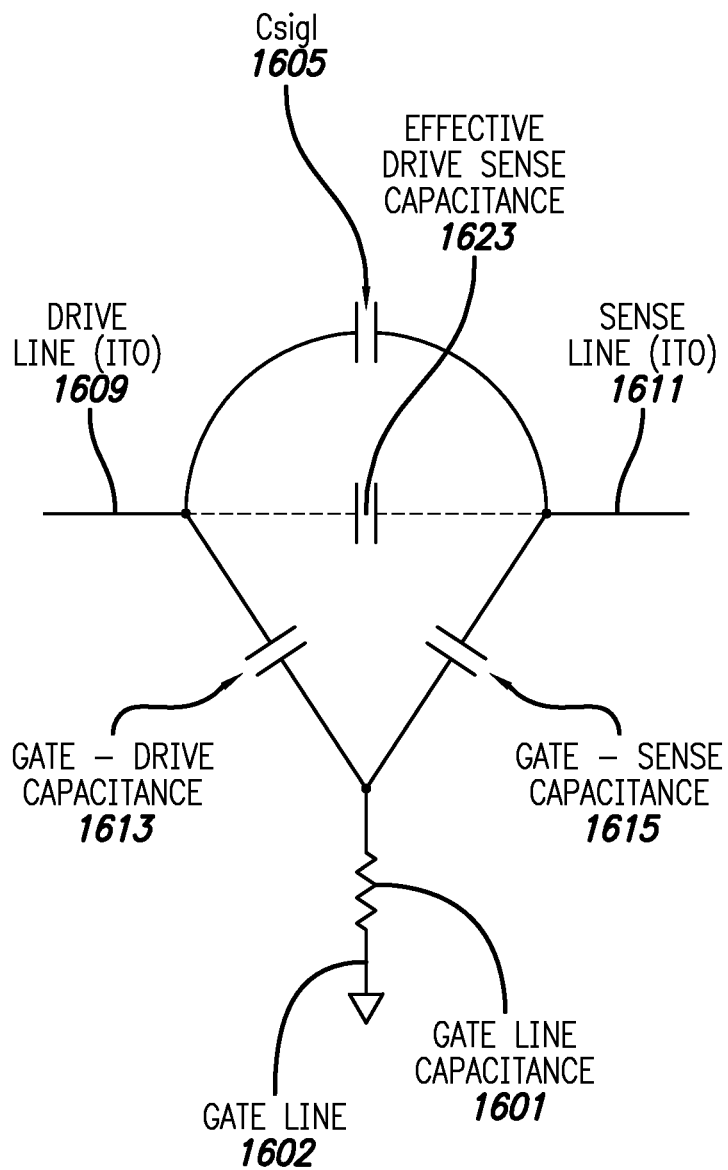
FIG. 16 illustrates an example circuit diagram of a drive line/gate line/sense line combination according to various embodiments.

FIG. 15 shows a touch screen glass layout 1500 including gate lines 1502, an active area 1503, drive lines 1509, sense lines 1511, and a charge amplifier 1530. The gate lines (including the upstream elements such as the gate driver) can be used during the display mode of operation and can be grounded during the touch sense mode of operation. However, even during the touch sensing mode of operation, the gate lines can provide a resistive structure and a capacitive coupling to the sense and drive lines as illustrated in FIG. 15. Touch can be sensed by a change in capacitance of capacitor 1505 between the drive lines and sense lines. However, there can be a capacitance that forms between gate lines 1502 and drive lines 1509 which is shown as a capacitance 1513 and also a capacitance formed to be gate lines 1502 and sense lines 1511 shown as a capacitance 1515. The effective circuit of this arrangement is shown in FIG. 16. It is noted that In FIG. 15, the gate lines, used in driving display pixel TFTs during the display mode of operation, are shown as providing a capacitive coupling to both the drive lines and the sense lines. Such a coupling can result from the close proximity of the gate lines to the drive and sense lines and from the fact that the gate lines can often cross over and/or be closely adjacent to drive and/or sense lines.

FIG. 16 shows an example circuit diagram of a drive line/gate line/sense line combination whose configuration results in an effective drive line to sense line capacitance 1505. FIG. 16 shows how effective drive-sense line capacitance 1623 (which results from a gate-drive line capacitance 1513 and gate-sense line capacitance 1515) can interfere with touch sensing based on a signal capacitance Csig 1505, particularly when effective drive-sense capacitance 1623 can be large relative to Csig 1505. Effective capacitance 1623 can be in parallel with Csig 1505, therefore it can interfere with touch sensing, and in fact, effective capacitance 1623 in some environments can be much greater than Csig 1505, making touch sensing difficult.

Figure 17:
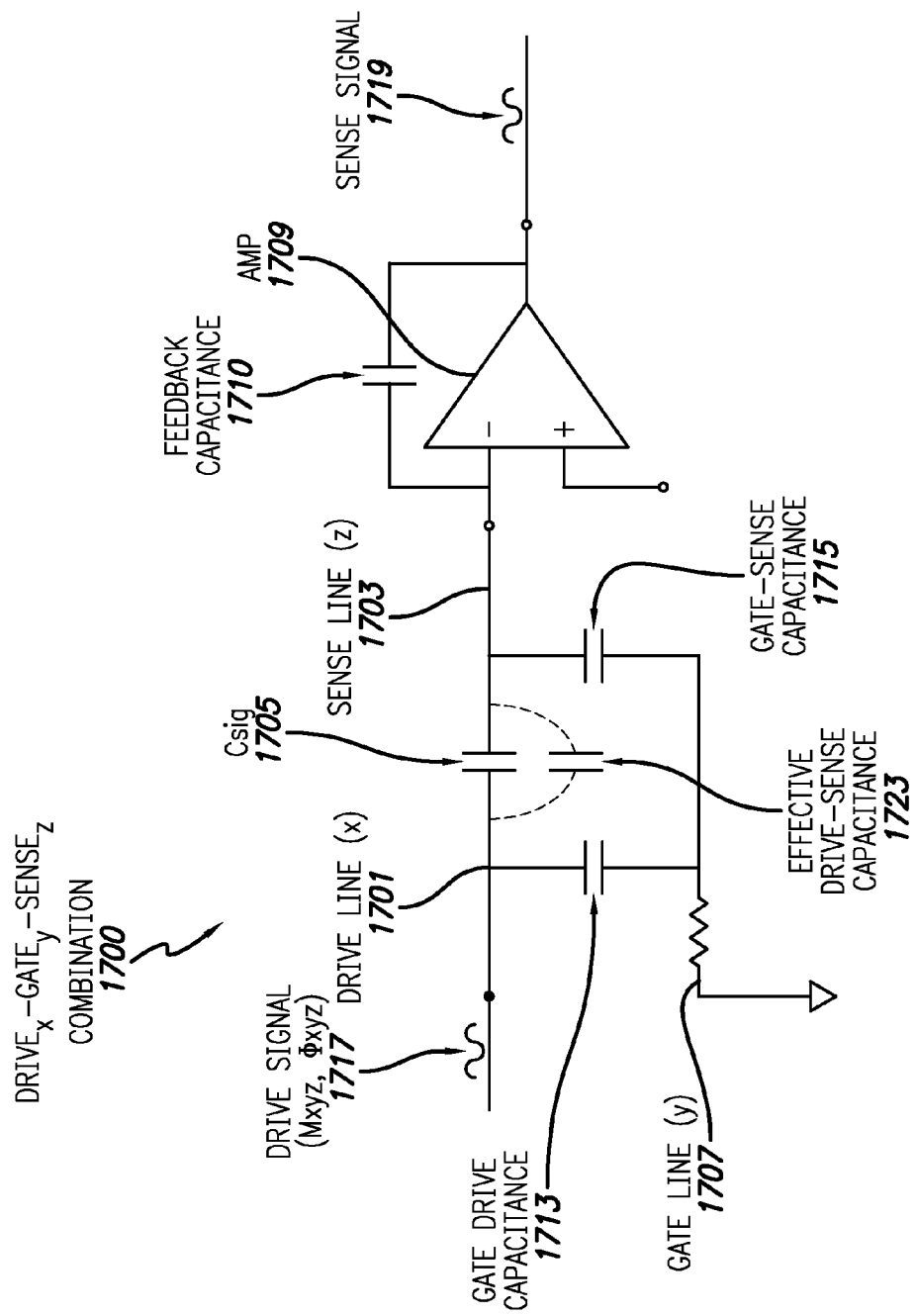
FIG. 17 illustrates an example circuit diagram illustrating a circuit including a combination of a drive line, a sense line, a gate line, and amplifier according to various embodiments.

FIG. 17 shows an example circuit diagram illustrating a circuit 1700 including a combination of a drive line 1701, a sense line 1703, a gate line 1707, and amplifier 1709. FIG. 17 also shows a Csig 1705, a gate-drive line capacitance 1713, gate-sense capacitance 1715 and an effective drive-sense capacitance 1723. Circuit 1700 can have a transfer function based on its particular configuration, which does not change. The transfer function of the circuit can be determined. Once the transfer function is known, the inverse of the transfer function can be determined. The inverse of the transfer function of circuit 1700 can be used to improve the performance of the touch sensing panel, as described in more detail below.

Referring again to FIG. 15, drive signals 1525a can be applied to a drive line/gate line/sense line/amplifier combination as shown in the figure. Through mutual capacitive coupling, drive signal 1525a can result in a sense signal 1527a in a sense line 1511, which can be input into amplifier 1530. Therefore, drive signal 1525a can be applied to a fixed circuit similar to circuit 1700, and similarly, the transfer function of the particular combination of drive/gate/sense/amplifier can be determined. Likewise, a drive signal 1525b can be applied to a different (e.g., adjacent) drive line 1509, and a corresponding sense signal 1527b can be generated on a sense line 1511. If the drive signals 1525a and 1525b are applied simultaneously, an output sense signal 1527z from the sense line 1511 can be a superposition of sense signals 1527a and 1527b. Compared to sense signal 1527a, sense signal 1527b can result from a different drive signal (1525b instead of 1525a) and a different drive/gate/sense/amplifier circuit (and hence, a different transfer function). However, the different circuits that result in sense signals 1527a and 1527b may be equalized by utilizing the inverses of their transfer functions. There may be a particular combination of drive signals 1525a and 1525b, for example, that result in sense signals 1527a and 1527b that are of equal magnitude and frequency, but 180 degrees out of phase with each other when there is no touch object (such as a finger) near the intersection of the drive and sense lines (a no-touch state). If the desired sense signal characteristics are applied to the inverses of the respective circuit transfer functions, the drive signal characteristics (e.g., magnitude and phase) that will produce the desired sense signals can be determined.

Because the gate-drive capacitance 1513 and the gate-sense capacitance 1515 can be based on the circuit configuration, which may not change, these capacitances can be subtracted out of a particular sense line by adjusting drive signals of multiple drive lines such that sense signals of the same frequency, but 180 degrees out of phase, can be generated in the sense line. In one simple example, if drive signals 1525a and 1525b are adjusted such that sense signals 1527a and 1527b are of the same magnitude and frequency and 180 degrees out of phase when the drive signals are applied in the no-touch state, the resulting superposition of the sense signals in sense line 1511 can be zero. If these same drive signals are applied when there is a touch object that causes a change in Csig at the drive-sense intersections, the resulting change in the output of sense line 1511 can be substantially the result of the change in Csig, because the value(s) of Csig can be the only aspect of the circuit that has changed from the no-touch state.

Figure 18:
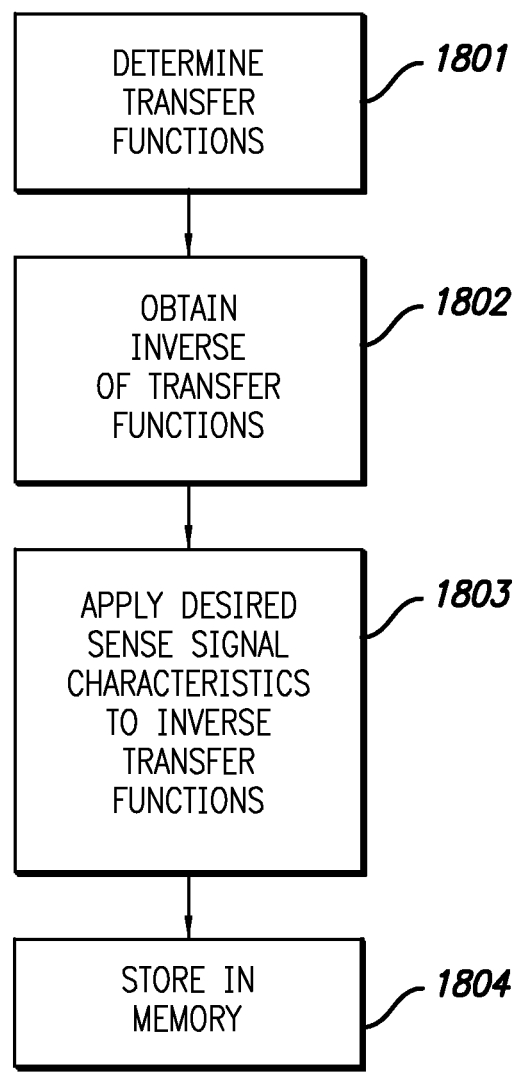
FIG. 18 is a flowchart of an example method of equalizing a touch panel according to various embodiments.

FIG. 18 is a flowchart of an example method of equalizing a touch panel. First, the transfer function of each drive-gate-sense-amplifier combination can be determined (1801). The inverses of the transfer functions can be obtained (1802). A desired set of signal characteristics (e.g., magnitude, frequency, phase, etc.) of individual sense signals of a sense line can be applied (1803) to each of the corresponding inverse transfer functions to obtain a corresponding set of drive signal characteristics that can generate the desired individual sense signals. The set of drive signal characteristics can be stored (1804) in a memory, such as a computer storage memory (e.g., RAM) for use by a computer program. The example method can be used to determine a set of drive signal characteristics that can generate sense signals 1527a and 1527b having the desired signal characteristics as described above, i.e., having the same magnitude and frequency and 180 degrees out of phase, in the no-touch state. In this way, the effective drive-sense capacitance that can result from the gate-drive and gate-sense capacitances may be reduced or eliminated.

Referring again to FIG. 16, gate line 1502 can have a gate line resistance 1601. Gate-drive capacitance 1513 and gate-sense capacitance 1515 can cause an effective drive-sense capacitance 1623. Gate-drive capacitance 1513 and gate-sense capacitance 1515 can each depend on gate line resistance 1601, which can be different for each gate line 1502. Because of the differences between gate line resistance 1601 among the different gate lines 1502, each of the gate lines can cause a different effective drive-sense capacitance 1623. Equalizing a circuit characteristic of non-touch sensing circuitry that affects the touch sensing of the touch sensing circuitry, such as the gate line resistances 1601 of the different gate lines, can cause the effective drive-sense capacitance 1623 of each of the gate lines to be the same. In other words, once the gate line resistances 1601 are set to be equal, the effect that each gate line has on corresponding drive signals can be the same, i.e., there may be no variation in the gate lines' effects from row to row. Therefore, by setting all of the gate line resistances 1601 to be equal, the panel can be equalized with respect to the gate lines because a sense signal output caused by a drive signal on one row can be the same as a sense signal output caused by the same drive signal applied to a different row. FIGS. 19-22 show some example configurations in which gate line resistances can be equalized.

Figure 19:
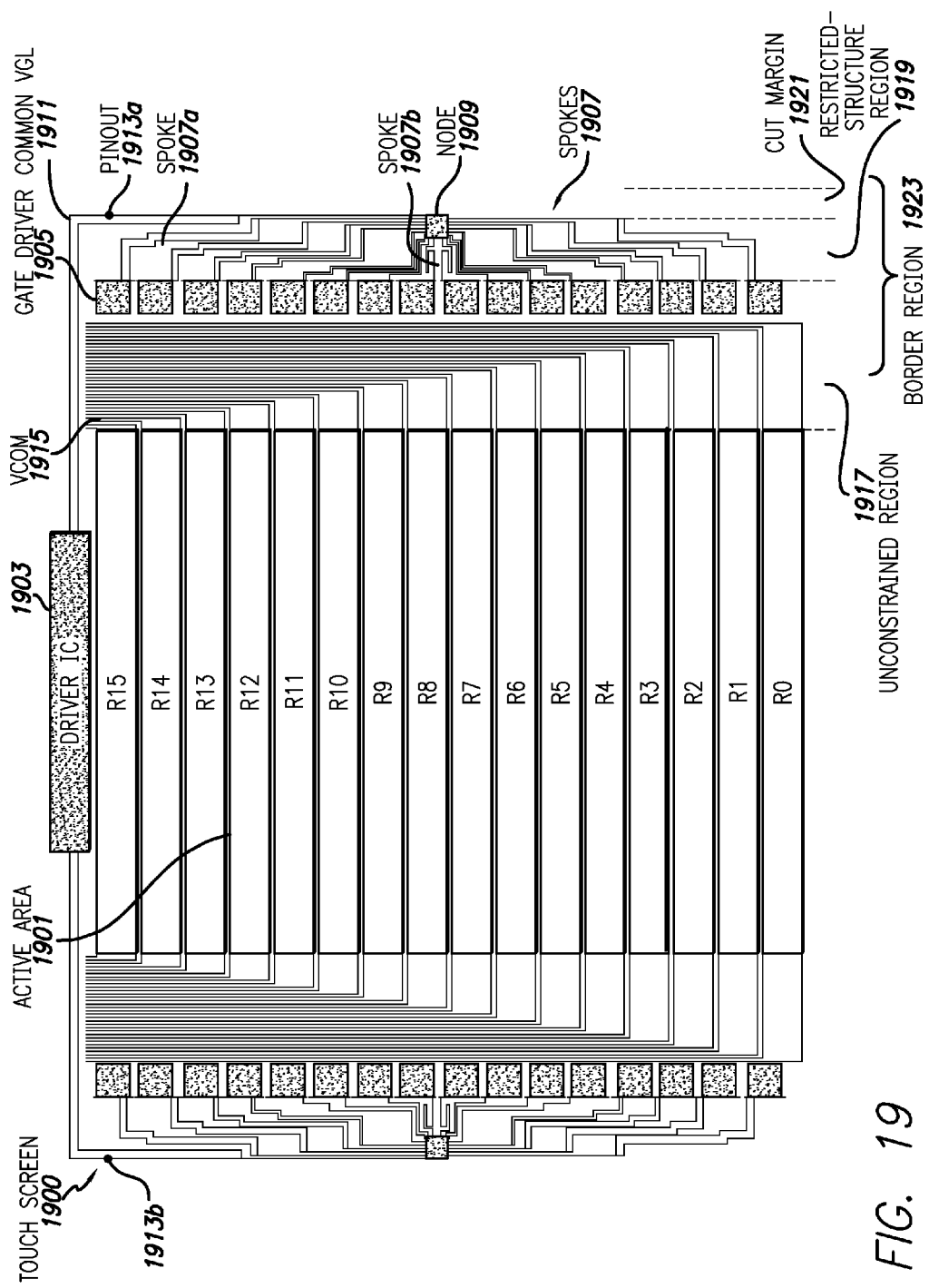
FIG. 19 illustrates an example configuration in which the impedances of the lines supplying the gate voltages to gate drivers may be equalized according to various embodiments.

FIG. 19 shows an example touch screen 1900 that can include an active area 1901, a driver integrated circuit (IC) 1903, and gate drivers 1905. Drivers 1905 can be supplied with a gate voltage through a hub and spoke system of connections including spokes 1907, including a spoke 1907a and a spoke 1907b, and a node (hub) 1909. Node 1909 can be connected to driver IC 1903 through a common VGL line 1911 in some embodiments, gate drivers 1905 and node 1909 and spokes 1907 can be disposed on glass, and driver IC 1903 can be disposed on, for example, a flexible printed circuit board. In this case, common VGL line 1911 from driver IC 1903 can be connected to node 1909 through right pinout 1913a. A left pinout 1913b can be provided for corresponding circuit elements on the left side of the active area 1901. FIG. 19 also shows Vcom lines 1915, which can be between gate drivers 1905 and active area 1901. Spokes 1907, node 1909, and the portion of common VGL line 1911 between pinout 1913 and node 1909 can be, for example, formed of a conductive material within the stackup of material structures on the glass of touch screen 1900.

FIG. 19 illustrates one way in which the impedances of the lines supplying the gate voltages to gate drivers 1905 may be equalized. In this example embodiment, common VGL line 1911 can be part of the path supplying the gate voltage to all of the gate drivers 1905, therefore, the impedance of common VGL line 1911 can be part of the total impedance of each of the paths to each of the gate drivers. Thus, common VGL line 1911 can be a common/shared path with a common/shared impedance among all of the circuit elements, in this case gate drivers, associated with each row stimulated in the touch sensing system. On the other hand, spokes 1907 are not shared among one or more gate drivers 1905; rather, each gate driver can be connected to node 1909 with its own spoke 1907. Therefore, the impedance of each spoke 1907 can contribute individually to the total impedance of the path of VGL to the corresponding gate driver.

In order to match the total impedances of the paths of VGL for each gate driver, for the reasons noted above, the impedances of spokes 1907 can be equalized. In this example embodiment, spoke 1907a can be longer than 1907b. Therefore, in order to make the impedance of spoke 1907a equal the impedance of spoke 1907b, spoke 1907a can be made wider (less resistive) than spoke 1907b. By forming the widths of the spokes differently, the total impedance of each path of VGL from driver IC 1903 to each gate driver 1905 through node 1909 can be equalized in this example. In this example, spokes 1907, node 1909, and a portion of common VGL line 1911 that is on glass may be formed in a restricted structure region 1919, for example, a sealant area of the touch screen just interior to a cut margin 1921. Gate drivers 1905 and Vcom lines 1915 may be formed in an unconstrained region 1917. Therefore, this example embodiment illustrates one way in which circuit characteristics of certain circuitry that is not a part of the touch sensing circuitry of a touch screen may be equalized such that the affect the circuitry has on touch sensing signals may be made the same for each drive/sense signal. Therefore, the effect of non-touch circuitry in a touch sensing system, which can cause a variation in output of the touch sensing system channels, can be equalized to reduce the variation. In addition, the example embodiment illustrates how a restricted structure region may be utilized efficiently by disposing, in this example, metal lines, e.g., spokes 1907, node 1909, common VGL line 1911, which can help to reduce the amount of structures that may be deposited or formed in unconstrained region 1917, which can reduce the width of unconstrained region 1917 and, hence, reduce the total width of a border region 1923. Another potential advantage of this example embodiment is that only a single pinout, i.e., pinout 1913, can be required to connect driver IC 1903 with all of the gate drivers 1905. This can further help reduce the required width of border region 1923. Another potential advantage is that the example configuration can help to decouple the gate drivers or reduce the coupling between the gate drivers, which can have beneficial results in a touch sensing application.

With the equalization, the effects of non-touch sensing circuitry, such as the gate driver/gate line system of the display circuitry, on drive/sense signal combinations can be reduced or minimized. Further, reductions may be achieved using the differential sense scheme in which both positive and negative phases of drive signals can be used and configured such that the superposition of the resulting sense signal portions can cancel to create a zero sense signal in a no-touch situation. Moreover, in some embodiments, equalization may be used in combination with a differential sense scheme since the drive signals used in a differential stimulation scheme to produce signals on a sense line whose superposition can cancel, can still produce signals on the sense line whose superposition cancels, perhaps more even more efficiently, because all of the signals are modified in the same way by the gate line circuitry once the gate line circuitry has been equalized.

Figure 20:
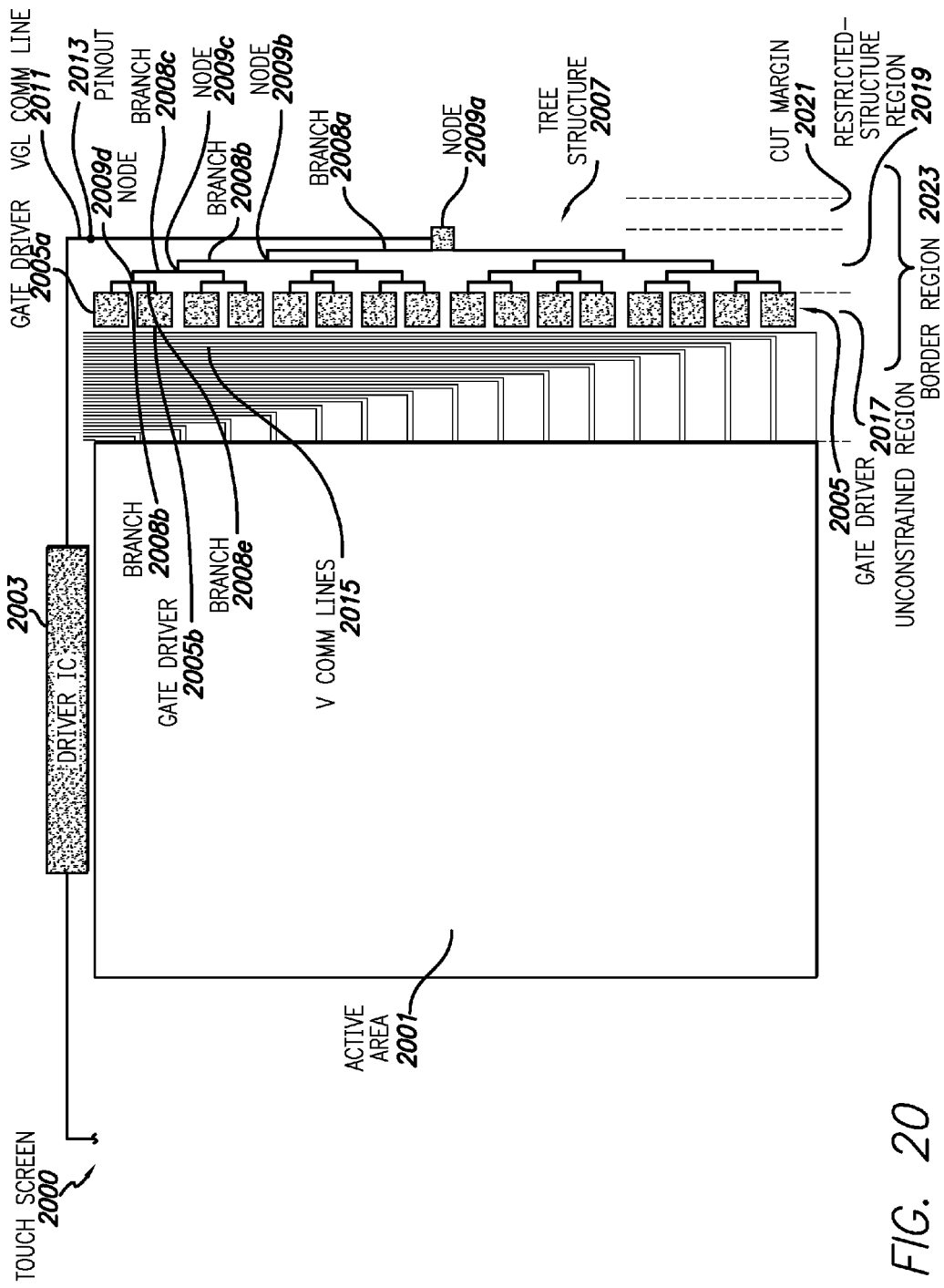
FIG. 20 illustrates another example configuration in which the impedances of the lines supplying the gate voltages to gate drivers may be equalized according to various embodiments.

FIG. 20 illustrates another example embodiment of a touch screen 2000 that can include an active area 2001, a driver IC 2003, and gate drivers 2005, including a gate driver 2005a and a gate driver 2005b. Gate drivers 2005 can be connected to driver IC 2003 and can be supplied a gate voltage VGL through a tree structure 2007 including branches 2008 and nodes 2009. A common node 2009a of tree structure 2007 can be connected to driver IC 2003 through a common VGL line 2011 through a pinout 2013. As in the previous example embodiment, common VGL line 2011 can be a shared path for the VGL supply for each gate driver 2005, therefore, the impedance of common VGL line 2011 can contribute to the total impedance of each path to a gate driver. However, in contrast to the previous example, portions of the path to node 2009a and each gate driver 2005 can be shared among a multiple of gate drivers, but not all gate drivers. For example, branch 2008a can be shared among the top half of gate drivers 2005 but not the bottom half of the gate drivers. Nodes 2009b, 2009c, and 2009d each can divide the conductive path into two portions, each to be shared by a different set of gate drivers 2005. For example, gate driver 2005a and 2005b can be served individually by branch 2008d and 2008e, respectively. Gate drivers 2005a and 2005b can share branches 2008c, 2008b, and 2008a. The impedance through each pathway that runs through node 2009a to a particular gate driver 2005 can be equalized. In this example, each of the two branches stemming from a particular node can be formed to be of equal impedance. In this example, each branch stemming from a node can have the same length as the other branch from that node. Therefore, each of the two branches from a node can have the same width and maintain the same impedance. In some embodiments, the lengths of individual branches may be different, and the widths, and/or other characteristics of the individual branches may be different while still maintaining equalization of the impedances of the paths to each gate driver 2005. In the present example embodiment, the impedance of each branch may be set equal to the impedances of the other branches. In other words, for example, the impedance of branch 2008a may be set equal to "1," the impedance of branch 2008b may be set equal to "1", etc., so that all of the branches can have an impedance of "1." In this example, tree structure 2007 can be a binary tree structure. For example, in setting the branches to all have the same impedance, because some branches can be longer than others, the width of the branches can be different to set the impedances of the individual branches stemming from each node to be equal. For example, branch 2008a can be made wider than branch 2008b if branch 2008a is longer than branch 2008b.

In this example, the amount of metal that is required to create the pathways for VGL, i.e., tree structure 2007, can be less than other embodiments. As in the previous embodiment, the metal line pathways for VGL may be formed in a restricted structure region 2019, while the gate drivers 2005 and the Vcom lines 2015 may be formed in an unconstrained region 2017. Restricted structure region 2019 can be between unconstrained region 2017 and a cut margin region 2021 of a border region 2023.

Figure 21:
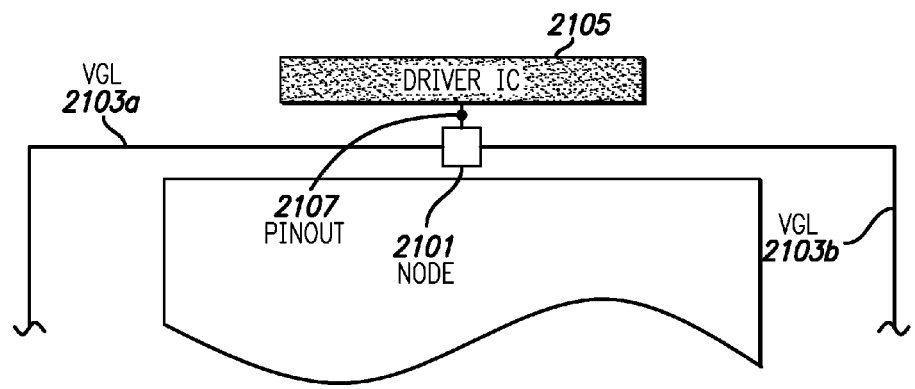
FIG. 21 illustrates an example configuration of a node between left and right common gate voltage lines that serve the left and right halves of gate drivers according to various embodiments.

Although not shown in FIGS. 19 and 20, VGL common lines (1911 and 2011) that exit from the left and right sides of the driver IC (1903 and 2003) to serve the gate drivers on the left and right sides of the touch screen, respectively, can be electrically connected within the driver IC. In other words, a node may exist within the driver IC that cannot be seen in the figures. FIG. 21 shows one example of a node 2101 between the left and right halves of a common VGL line 2103a and 2103b that can serve the left and right halves of gate drivers, respectively, that can be formed outside of a driver IC 2105, for example, on the glass such that only one pinout 2107 (replacing the right pinout 2013 and the corresponding left pinout, not shown) can be required to connect an output of driver IC 2105 to metal VGL lines on the glass.

Figure 22:
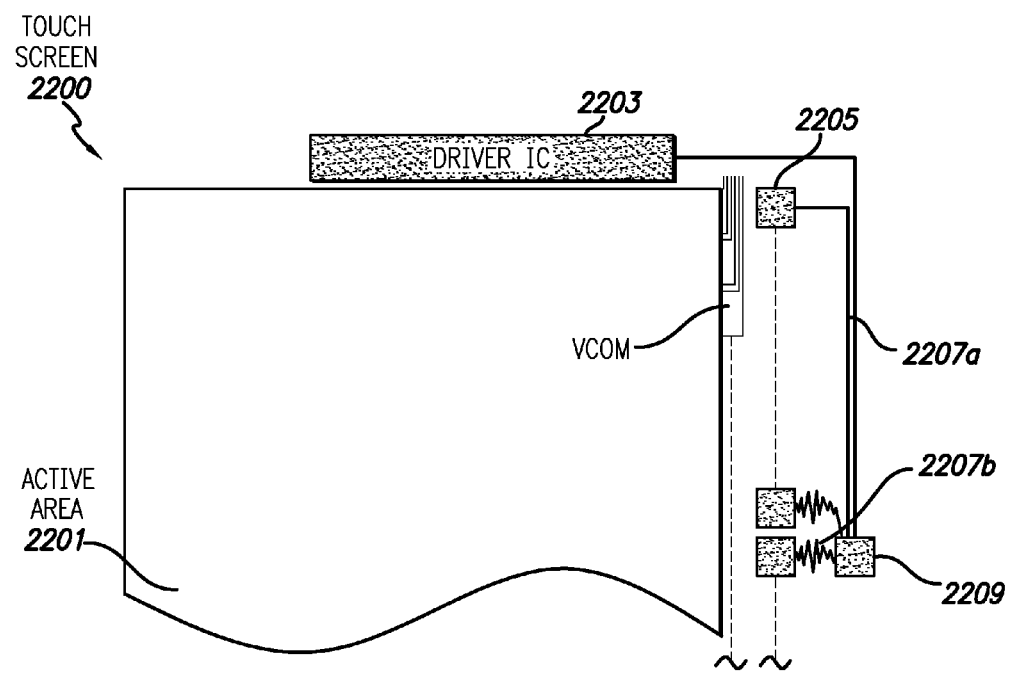
FIG. 22 illustrates another example configuration in which the impedances of the lines supplying the gate voltages to gate drivers may be equalized according to various embodiments.

FIG. 22 illustrates an example embodiment similar to the example of FIG. 20 and including a hub and spoke structure. However, in FIG. 22, the impedances of the different spokes can be made equal not by forming the spokes of different widths, but rather by forming the spokes such that the lengths of the paths of node 2209 and gate drivers 2205 are equal. For example, spoke 2207a, which runs between node 2209 and a gate driver further away from the node can be relatively straight/smooth, and a spoke 2207b, which runs between the node and a gate driver closer to the node can be in a zigzag pattern that allows the length of 2207b to be equal to the length of 2207a. Therefore, in this example, the impedances of spokes 2207a and 2207b can be equal. Other ways to match or equalize impedances can include, for example, different combinations of lengths, widths, patterns, materials, connections, etc.

Figures 23, 24:
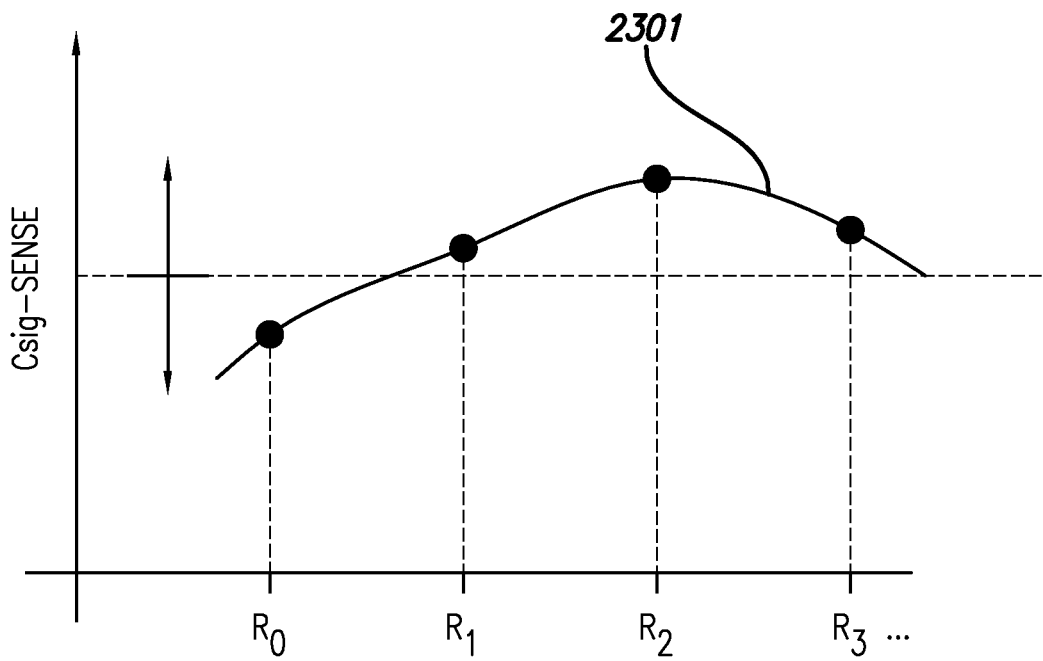
FIG. 23 is a graph illustrating a function based on signal capacitance data that can result from multiple drive signals applied simultaneously to an example touch screen according to various embodiments.
FIG. 24 illustrates an example pattern for multiple scans of simultaneous applications of drive signals for an example multiple stimulation drive scheme according to various embodiments.

When multiple drive signals are applied simultaneously, resulting in a sense signal that can be a superposition of individual component sense signals corresponding to the individual drive signals, there can be some information that is lost with regard to touch sensing. FIG. 23 is a graph illustrating a function 2301 based on Csig data that can result from multiple drive signals applied simultaneously to an example touch screen such as touch screen glass layout 1500. While the shape of function 2301 (i.e., the relative values of the Csig data points) can be known, the absolute values of the data points may not be known from only a single scan of the touch screen (i.e., by simultaneously applying a drive signal over each of multiple drive lines and obtaining a single sense signal output from the sense line, the output can be a superposition of multiple sense signals generated in the sense line by the multiple drive signals). However, information of the absolute values of the Csig data points may be determined through multiple scans of the touch screen using different combinations of drive signals. Methods using multiple stimulation signals with touch sensing devices are disclosed in U.S. patent application Ser. No. 12/283,435, filed on Sep. 10, 2008, titled "PHASE COMPENSATION FOR MULTI-STIMULUS CONTROLLER", by Christoph H. KRAH, the entire contents of which are incorporated herein by reference (note, drive signals may be referred to herein as stimulation signals).

In some touch sensing devices, multiple drive lines can be stimulated simultaneously. When stimulating multiple drive lines with multiple drive signals simultaneously, multiple individual sense signals (component sense signals) can be generated in the sense line. The component signals form a composite sense signal, which can be received and used, for example, for obtaining touch measurement data (e.g., signal capacitance measurements) contained in the component signals. An example drive signal transmission operation of a touch controller can include generating stimulation signals Vstim+ and Vstim−. Vstim− can be a signal with the waveform of Vstim+ that is inverted about a common voltage Vcm, such as ground. In other words, Vstim+ and Vstim− can have the same frequency and relative magnitude and are 180 degrees out of phase. During each step of a multi-step scan of touch panel sensor, one of Vstim+, Vstim−, Vcm, or ground can be selected for transmission to a corresponding drive line of the touch panel sensor. Ground can be used to put the corresponding output buffer into a low power state to conserve power if that buffer is not used. The selection can be made based on stim matrix, for example, stored in a memory (such as RAM 2533a of FIG. 25 described below). At each step, different signal combinations can be selected to stimulate the panel differently than in other steps. Assuming a linear system, the total signal charge Qsig_tot injected into a sense line due to the multiple, simultaneous drive line signals is the sum of the signal charges injected into the sense line by each drive line signal:

$$Q\text{sig\_tot}_C = Q\text{sig}_C(0) + Q\text{sig}_C(1) + \ldots + Q\text{sig}_C(M-1)$$

where $Q\text{sig}_C(R)$ is the injected charge at the pixel corresponding to drive line R of sense channel C. Thus, the total injected charge can be a composite of multiple injected signal charges. Stimulating the drive lines with different combinations of drive signals over multiple steps can generate multiple different total injected charge measurements. Each individual injected signal charge for a given drive line depends on a signal capacitance associated with the drive line and the sense line. The total injected charge information over multiple steps can be used to obtain the signal capacitance associated with each drive line/sense line combination, as one skilled in the art would readily understand after reading the present disclosure.

However, while the stimulation matrix represents the drive signals that are selected for each drive line for each step in a scan, the stimulation matrix might not reflect how the system is actually being stimulated once the drive signals are selected. In other words, while stimulating an ideal touch sensing system with drive signals that are of the same frequency and magnitude and 180 degrees out of phase may be desirable, the drive line/sense line configurations of a real-world touch screen might require different drive signals to achieve the desired effect. In other words, the stimulation matrix may not capture other factors in the stimulation of drive line/sense line combinations and the measurement of sense signals that may depend on the configuration and operation of the system, such as interaction between the touch sensing circuitry and the display circuitry of a touch screen. Therefore, the stim matrix can include signal characteristics of the drive signals that have been determined by methods described herein according to various embodiments. In this way, for example, the drive signal characteristics in the stim matrix can compensate for undesirable interactions between display circuitry, such as the gate line system, and the particular drive line/sense line configurations of the touch screen such that the touch sensing of the touch screen more closely approximates an ideal touch sensing system stimulated with drive signals having the same frequency and relative magnitude and 180 degrees out of phase.

FIG. 24 illustrates an example pattern for multiple scans of simultaneous applications of drive signals for an example multiple stimulation drive scheme according to various embodiments. In particular, FIG. 24 shows a 4×4 Hadamard matrix, and each row of the matrix may be used to determine the desired phases of the individual sense signals generated in a sense line by corresponding drive signals during one scan. Based on the desired phase relationships of each row (scan), the method of FIG. 19 may be used to determine the magnitude and phase, for example, of the drive signals of the scan that will result in the desired individual sense signals. For example, a first scan can correspond to the second row of the Hadamard matrix, in which four desired individual sense signals have the same frequency and magnitude, and phases of +1, −1, +1, and −1, respectively, where +1 can correspond to a phase of 0 degrees and −1 can correspond to a phase of 180 degrees, for example.

For a touch screen with 16 drive lines, for example, stimulating eight drive lines with a stimulation signal and eight drive lines with the negative phase stimulation signal can allow the effective drive-sense capacitances caused by the gate lines to be cancelled out.

In copending U.S. patent application Ser. No. 12/545,669 titled "INTEGRATED TOUCH SCREEN SENSITIVE DISPLAY GATE DRIVER", incorporated herein by reference, circuitry, such as active ground circuitry, is described to reduce the effects of non-touch sensing circuitry, such as gate drivers/lines and corresponding circuitry, on touch sensing. As a result of the foregoing, various circuit structures of the gate drivers, for example, utilized in the active ground circuitry which may have been desired to compensate for the negative effects of non-touch sensing circuitry, may be eliminated.

Figure 25:
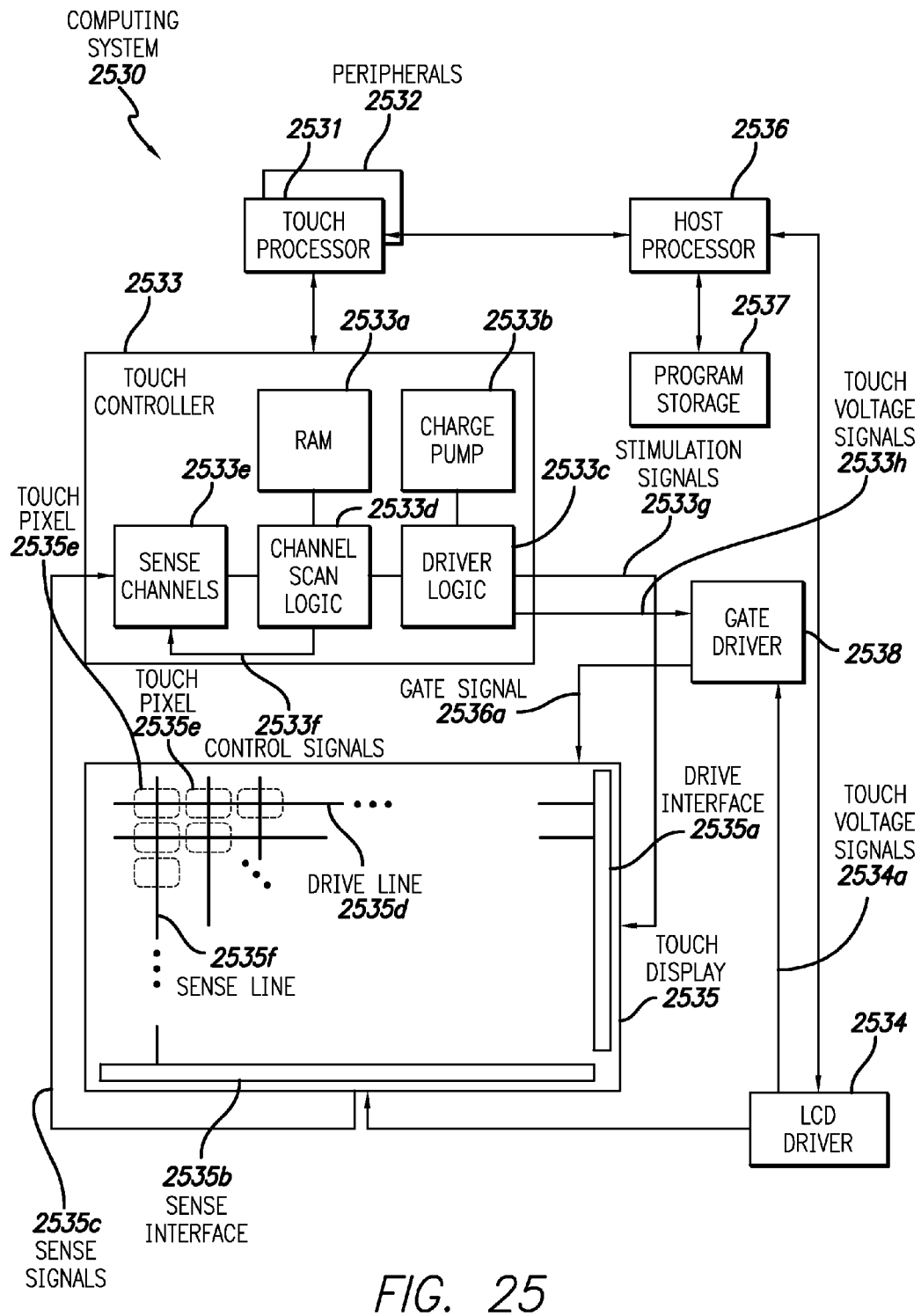
FIG. 25 illustrates an example computing system according to various embodiments.

FIG. 25 illustrates an example computing system according to various embodiments. In the example of FIG. 25, computing system 2500 can include one or more touch processors 2501, peripherals 2502, a touch controller 2503, and touch sensing circuitry (described in more detail below). Peripherals 2502 can include, but are not limited to, random access memory (RAM) or other types of memory or storage, watchdog timers and the like. Touch controller 2503 can include, but is not limited to, one or more sense channels 2503$e$, channel scan logic 2503$d$, and driver logic 2503$c$. Channel scan logic 2503$d$ can access RAM 2503$a$, autonomously read data from the sense channels and provide control for the sense channels. In addition, channel scan logic 2503$d$ can control driver logic 2503$c$ to generate stimulation signals 2503$g$ at various frequencies and phases that can be selectively applied to drive regions of the touch sensing circuitry of touch display 2505, as described in more detail below. In some embodiments, touch controller 2503, touch processor 2501, and peripherals 2502 can be integrated into a single application specific integrated circuit (ASIC).

Computing system 2500 can also include a host processor 2506 for receiving outputs from touch processor 2501 and performing actions based on the outputs. For example, host processor 2506 can be connected to program storage 2507 and a display controller, such as LCD driver 2504. Host processor 2506 can use LCD driver 2504 to generate an image on touch display 2505, such as an image of a user interface (UI), and can use touch processor 2501 and touch controller 2503 to detect a touch on or near touch display 2505, such a touch input to the displayed UI. The touch input can be used by computer programs stored in program storage 2507 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 2506 can also perform additional functions that may not be related to touch processing.

Touch display 2505 can include touch sensing circuitry that can include a capacitive sensing medium having drive lines 2505$d$ and sense lines 2505$f$. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines 2505$d$ can be driven by stimulation signals 2503$g$ from driver logic 2503$c$ through a drive interface 2505$a$, and resulting sense signals 2505$c$ generated in sense lines 2505$f$ can be transmitted through a sense interface 2505$b$ to sense channels 2503$e$ in touch controller 2503. In this way, drive lines and sense lines can be part of the touch sensing circuitry that can interact to form capacitive sensing nodes, which can be thought of as touch picture elements (touch pixels), such as touch pixels 2505$e$. This way of understanding can be particularly useful when touch display 2505 can be viewed as capturing an "image" of touch. In other words, after touch controller 2503 has determined whether a touch has been detected at each touch pixel in the touch display, the pattern of touch pixels in the touch display at which a touch occurred can be thought of as an "image" of touch (e.g. a pattern of fingers touching the touch display).

Computing system 2500 can include gate driver 2508, which can receive voltage signals 2504$a$ (and other inputs) from the LCD driver 2504 to drive gate lines of the touch display 2505 so that image and/or graphics data can be displayed on the display. The gate driver 2508 can also receive voltage signals 2503$h$ from the touch controller 2503 to replace the LCD voltage signals 2504$a$ when the touch display 2505 senses a touch in order to reduce adverse influence, e.g., interference, of the LCD signals on the touch display that can result in a false touch image. The gate driver 2508 can transmit either the LCD voltage signals 2504$a$ or the touch voltage signals 2503$h$ as gate line signals 2508$a$ to the touch display 2505. The touch controller 2503 can control which of either the LCD signals or the touch signals the gate driver 2508 can transmit to the touch display 2505. In some embodiments, the LCD driver 2504 can control which signals. In some embodiments, the gate driver 2508 can control which signals. In some embodiments, other computing blocks of the computing system 2500 can individually or in combination with the touch controller and/or the LCD driver control which signals.

Note that one or more of the functions described above can be performed by firmware stored in memory (e.g. one of the peripherals 2502 in FIG. 25) and executed by touch processor 2501, or stored in program storage 2507 and executed by host processor 2506. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch display is not limited to touch, as described in FIG. 25, but may be a proximity display or any other display having switchable gate driver circuitry according to various embodiments. In addition, the touch display described herein can be either a single-touch or a multi-touch sensor panel.

Figure 26:
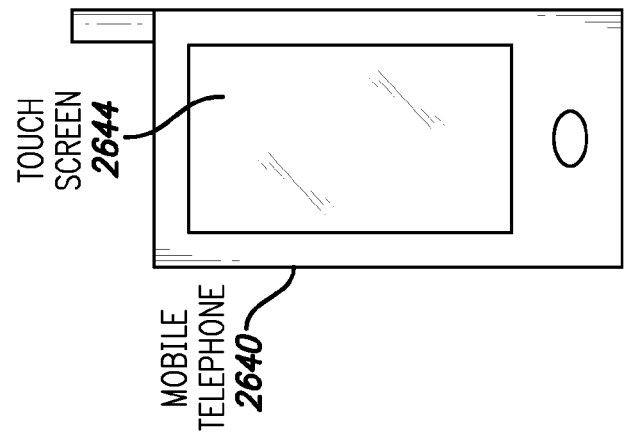

FIG. 26 illustrates an example mobile telephone 2600 that can include touch screen 2604 and/or another touch sensitive display according to various embodiments described herein, for example.

Figure 27:
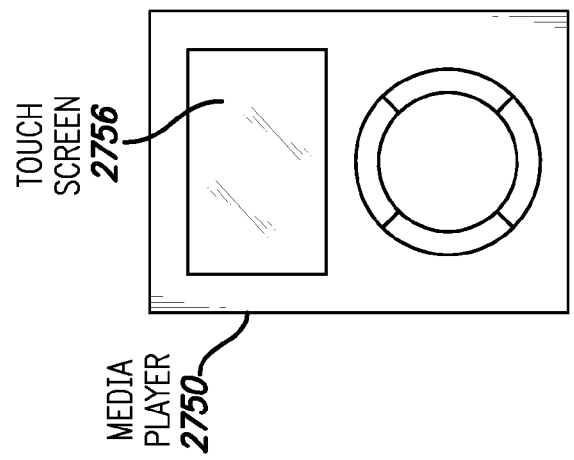

FIG. 27 illustrates an example digital media player 2700 that can include touch screen 2704 and/or another touch sensitive display according to various embodiments described herein, for example.

Figure 28:
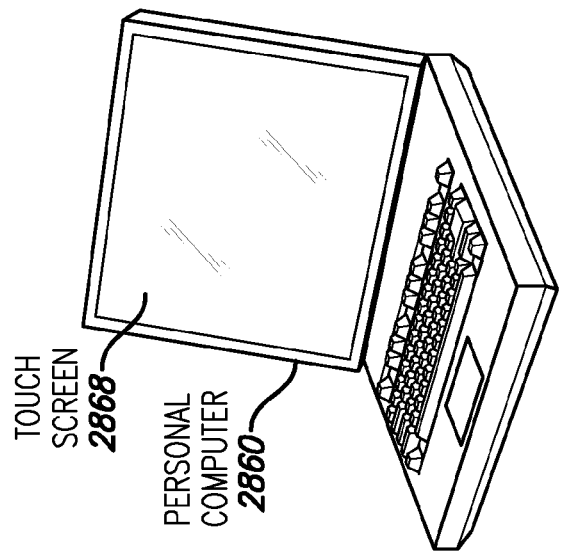
FIGS. 26, 27, and 28 illustrate an example mobile telephone, example digital media player, and example personal computer, respectively that can each include a touch screen and/or another touch sensitive display according various embodiments.

FIG. 28 illustrates an example personal computer 2600 that can include touch screen 2804 and/or another touch sensitive display according to various embodiments described herein, for example.

The mobile telephone, media player, and personal computer of FIGS. 26-28 can be thinner, lighter, cost saving, and power saving with an integrated touch sensitive display having various embodiments described herein, for example.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch screen including an active area, the active area including a plurality of display pixels and touch sensing circuitry, the touch screen comprising:
   a plurality of gate drivers disposed in a first region adjacent to the active area, each of the plurality of gate drivers driving a respective row of display pixels; and
   touch sensing lines connected to the touch sensing circuitry in the active area, each touch sensing line extending from the active area to a second region, the second region adjacent to the first region, wherein at least one touch sensing line includes electrically coupled portions routed through gaps between adjacent pairs of gate drivers in the first region, and the touch sensing lines are electrically isolated from each other.

2. The touch screen of claim 1, wherein the second region is a region for sealant, and the first region is an unconstrained region.

3. The touch screen of claim 1, wherein a substantial portion of the touch sensing lines are formed in the second region, wherein the second region is on a side of the plurality of gate drivers opposite to the active area.

4. The touch screen of claim 3,
   wherein the first region is an unconstrained region including a plurality of circuit elements,
   wherein the second region is a restricted-structure region including sealant and excluding the plurality of circuit elements.

5. The touch screen of claim 1,
   wherein a first gap is between a first adjacent pair of gate drivers, and a second gap is between a second adjacent pair of gate drivers,
   wherein a first portion of the at least one touch sensing line is formed in the first gap and a second portion of the at least one touch sensing line is formed in the second gap.

6. The touch screen of claim 1, wherein each of the touch sensing lines exits from a same side of the touch screen.

7. The touch screen of claim 1, wherein the plurality of gate drivers includes:
   a first group of gate drivers disposed on one side of the active area, the first group of gate drivers driving some of the display pixels; and
   a second group of gate drivers disposed on an opposing side of the active area, the second group of gate drivers driving other of the display pixels.

8. The touch screen of claim 1, wherein each of the plurality of gate drivers drives a single gate line.

9. The touch screen of claim 1, wherein the touch screen is incorporated in a touch screen device that further comprises:
   a processor; and
   a memory.

10. The touch screen of claim 9, wherein the touch screen device is one of a digital media player, a mobile telephone, and a personal computer.

11. The touch screen of claim 1, wherein the at least one touch sensing line includes portions formed in an area surrounding the adjacent pairs of gate drivers.

12. The touch screen of claim 1, wherein the at least one touch sensing line includes a perforated material.

13. A touch screen panel comprising:
   a restricted-structure region including a sealant; and
   a touch screen including an active area having a plurality of display pixels and touch sensing circuitry, the touch screen comprising:
      a plurality of gate drivers disposed in an unconstrained region adjacent to the active area, each of the plurality of gate drivers driving a respective row of display pixels;
      a plurality of touch sensing lines disposed in the unconstrained region and connected to the touch sensing circuitry in the active area, the plurality of touch sensing lines electrically isolated from each other, wherein at least one touch sensing line in the unconstrained region includes electrically coupled portions routed through gaps between adjacent pairs of gate drivers; and
      at least some of the plurality of touch sensing lines further disposed in the restricted-structure region adjacent to the unconstrained region.

14. The touch screen of claim 13, wherein the at least one touch sensing line further includes portions formed in an area surrounding the adjacent pairs of gate drivers.

15. The touch screen of claim 13, wherein at least another touch sensing line is excluded from the restricted-structure region.

16. The touch screen of claim 13, wherein the touch sensing lines in the unconstrained region are formed such that the touch sensing lines occupy substantially all of an area in the unconstrained region and are electrically isolated from the plurality of gate rivers.

17. The touch screen of claim 13, wherein each of the touch sensing lines exit from a same side of the touch screen.

18. A method of routing touch sensing lines on a touch screen having a plurality of display pixels and touch sensing circuitry in an active area of a touch screen, the method comprising:

routing the touch sensing lines from the touch sensing circuitry through an unconstrained region adjacent to the active area,
wherein the touch sensing lines are electrically isolated from each other, and
at least one touch sensing line is routed through the unconstrained region and includes electrically coupled portions routed through gaps between adjacent pairs of gate drivers in the unconstrained region; and
routing at least some of the touch sensing lines to a restricted-structure region adjacent to the unconstrained region, wherein the restricted-structure region includes sealant.

19. The method of claim 18, wherein the at least one touch sensing line further includes portions formed in an area surrounding the adjacent pairs of gate driver.

20. The method of claim 18, further comprising routing the at least one touch sensing line on a same layer as the adjacent pairs of gate drivers.

21. The method of claim 18 further comprising routing the touch sensing lines to a single edge of the touch screen.

22. A touch screen, comprising:
an active area having a plurality of display pixels and touch sensing circuitry;
means for routing touch sensing lines to the touch sensing circuitry through an unconstrained region of the touch screen adjacent to the active area, the unconstrained region including a plurality of gate drivers, wherein at least one touch sensing line includes electrically coupled portions routed through gaps between adjacent pairs of gate drivers un the unconstrained region, and the touch sensing lines are electrically isolated from each other; and
means for routing at least some of the touch sensing lines to a restricted-structure region of the touch screen, the restricted-structure region adjacent to the unconstrained region, the restricted structure region being a region for sealant.

23. The touch screen of claim 22, wherein the means for routing at least some of the touch sensing lines to the restricted-structure region comprises means for forming portions of the at least some of the touch sensing lines, wherein the portions of each of the at least some of the touch sensing lines are routed through gaps between adjacent pairs of gate drivers.

24. The touch screen of claim 22, wherein the means for routing at least some of the touch sensing lines to the restricted-structure region comprises means for forming portions of the at least some of the touch sensing lines, wherein the portions of each of the at least some of the touch sensing lines are formed in an area surrounding the adjacent pairs of gate drivers.

25. The touch screen of claim 22, wherein the means for routing the touch sensing lines to the touch sensing circuitry through the unconstrained region comprises means for routing the touch sensing lines to a same edge of the touch screen.

* * * * *